(12) United States Patent
Yoshida

(10) Patent No.: US 10,054,020 B2
(45) Date of Patent: Aug. 21, 2018

(54) EXHAUST PURIFICATION CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Kohei Yoshida, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 15/476,377

(22) Filed: Mar. 31, 2017

(65) Prior Publication Data

US 2017/0292423 A1   Oct. 12, 2017

(30) Foreign Application Priority Data

Apr. 12, 2016   (JP) .................................. 2016-079400

(51) Int. Cl.
*F01N 3/00* (2006.01)
*F01N 3/20* (2006.01)
(Continued)

(52) U.S. Cl.
CPC ........... *F01N 3/206* (2013.01); *F01N 3/0814* (2013.01); *F01N 3/0842* (2013.01); *F01N 3/0871* (2013.01); *F01N 3/0885* (2013.01); *F01N 3/208* (2013.01); *F01N 3/2066* (2013.01); *F01N 9/00* (2013.01); *F01N 13/009* (2014.06); *F01N 2250/12* (2013.01); *F01N 2260/04* (2013.01); *F01N 2430/06* (2013.01); *F01N 2610/02* (2013.01); *F01N 2900/1404* (2013.01); *F01N 2900/1411* (2013.01); *F01N 2900/1618* (2013.01); *Y02T 10/24* (2013.01)

(58) Field of Classification Search
USPC .................. 60/274, 286, 295, 297, 301, 303
See application file for complete search history.

(56) References Cited

U.S. PATENT DOCUMENTS 6,973,776 B2 * 12/2005 van Nieuwstadt .... F01N 3/0814
                                                    60/274
8,904,760 B2 * 12/2014 Mital ...................... F01N 3/021
                                                    60/274
(Continued)

FOREIGN PATENT DOCUMENTS

JP            4893876 B2    3/2012
WO       2011/145227 A1   11/2011

*Primary Examiner* — Binh Q Tran
(74) *Attorney, Agent, or Firm* — Oliff PLC

(57) ABSTRACT

During execution of a first purification process of fluctuating a hydrocarbon concentration in exhaust gas flowing into a first catalyst with an amplitude within a prescribed range at a time interval within a prescribed range, when a switch request to a second purification process of purifying NOx in a second catalyst by adding urea water into the exhaust gas is generated, the switch to the second purification process is prohibited on the condition that a current NOx purification rate (a first purification rate R1) is higher than a purification rate (a second purification rate R2) on the assumption that the second purification process is executed, and an HC poisoning recovery stand-by process of reducing an additive amount of hydrocarbon per once in the first purification process is executed so as to reduce a slip amount of hydrocarbon into the downstream of the first catalyst.

7 Claims, 10 Drawing Sheets

(51) Int. Cl.
    *F01N 3/08*     (2006.01)
    *F01N 9/00*     (2006.01)
    *F01N 13/00*     (2010.01)

(56) References Cited

U.S. PATENT DOCUMENTS

| | | | |
|---|---|---|---|
| 9,212,614 B2* | 12/2015 | Ancimer | F02D 41/027 |
| 9,500,110 B2* | 11/2016 | Ota | F01N 3/106 |
| 2009/0007548 A1* | 1/2009 | Itoh | B01D 53/9409 |
| | | | 60/286 |
| 2012/0131908 A1 | 5/2012 | Bisaiji et al. | |
| 2012/0144802 A1* | 6/2012 | Driscoll | F01N 3/0253 |
| | | | 60/274 |
| 2013/0058840 A1 | 3/2013 | Inoue et al. | |

\* cited by examiner

EXHAUST PURIFICATION CONTROL DEVICE FOR INTERNAL COMBUSTION ENGINE

INCORPORATION BY REFERENCE

The disclosure of Japanese Patent Application No. 2016-079400 filed on Apr. 12, 2016 including the specification, drawings and abstract is incorporated herein by reference in its entirety.

BACKGROUND

1. Technical Field

The present disclosure relates to an exhaust purification control device for an internal combustion engine, applied to an exhaust gas control apparatus of an internal combustion engine, the exhaust gas control apparatus including a first NOx catalyst provided in an exhaust passage of the internal combustion engine, a hydrocarbon addition valve that adds hydrocarbon to exhaust gas flowing into the first NOx catalyst, a second NOx catalyst provided in a downstream of the first NOx catalyst, and a urea addition valve provided between the first NOx catalyst and the second NOx catalyst in the exhaust passage.

2. Description of Related Art

International Publication No. 11/145227, for example, proposes an exhaust gas control apparatus including a first NOx catalyst provided in an exhaust passage of an internal combustion engine, a hydrocarbon addition valve that adds hydrocarbon to exhaust gas flowing into the first NOx catalyst, a second NOx catalyst provided in a downstream of the first NOx catalyst, and a urea addition valve provided between the first NOx catalyst and the second NOx catalyst in the exhaust passage. Here, the first NOx catalyst has characteristics in which NOx in the exhaust gas flowing therein is reduced when a hydrocarbon concentration in the exhaust gas is fluctuated with an amplitude within a prescribed range at a time interval within a prescribed range, and a storage amount of NOx increases when the time interval is made longer than a value within the prescribed range. The control device described in the document is configured such that, in a case where an exhaust-gas temperature is high, the hydrocarbon addition valve is operated to keep the hydrocarbon concentration to flow into the first NOx catalyst with the amplitude within the prescribed range at the time interval within the prescribed range, so as to execute a process (a first purification process) of purifying NOx. Further, when a hydrocarbon consumption of the first purification process increases, the control device is configured to execute a process (a second purification process) of purifying NOx by the second NOx catalyst by adding urea water into the exhaust gas from the urea addition valve.

In the meantime, while the first purification process is executed, hydrocarbon may slip into the downstream of the first NOx catalyst. In a case where the hydrocarbon thus slipping cannot be oxidized by the second NOx catalyst, the second NOx catalyst is poisoned (HC-poisoned) by hydrocarbon, so that a part that is HC-poisoned cannot be effectively utilized as the catalyst, thereby resulting in that a purification ability of the second NOx catalyst decreases. When a switch request to a second purification process is generated at this time, there is such a possibility that an original purification ability of the second purification process cannot be yielded due to a low purification ability of the second NOx catalyst right after the switching.

SUMMARY

The present disclosure provides an exhaust purification control device for an internal combustion engine, the exhaust purification control device being able to restrain shifting from a state where a first purification control is executed but a second purification process is not executed to a state where the second purification process is executed in a state where a purification ability of the second purification process decreases.

1. An exhaust purification control device for an internal combustion engine is applied to an exhaust gas control apparatus for an internal combustion engine, the exhaust gas control apparatus including: a first NOx catalyst provided in an exhaust passage of the internal combustion engine; a hydrocarbon addition valve configured to add hydrocarbon to exhaust gas flowing into the first NOx catalyst; a second NOx catalyst provided in a downstream of the first NOx catalyst; and a urea addition valve provided between the first NOx catalyst and the second NOx catalyst in the exhaust passage. The first NOx catalyst has characteristics in which NOx in the exhaust gas is reduced when a hydrocarbon concentration in the exhaust gas flowing into the first NOx catalyst is fluctuated with an amplitude within a prescribed range at a time interval within a prescribed range and a storage amount of NOx increases when the time interval becomes longer than a value within the prescribed range. The exhaust purification control device includes: a first purification portion configured to execute a first purification process, which is a process of intermittently adding the hydrocarbon into the exhaust gas from the hydrocarbon addition valve by operating the hydrocarbon addition valve, so as to purify NOx while fluctuating the hydrocarbon concentration in the exhaust gas flowing into the first NOx catalyst with the amplitude within the prescribed range at the time interval within the prescribed range; and a second purification portion configured to execute a second purification process, which is a process of purifying NOx by use of the second NOx catalyst by adding urea water into the exhaust gas from the urea addition valve. The first purification portion executes a HC poisoning recovery stand-by process of, on the condition that an execution request of the second purification process is generated during execution of the first purification process, reducing an additive amount per once from the hydrocarbon addition valve in the first purification process as compared with an additive amount per once before the execution request is generated, prior to start of execution of the second purification process. This can be also expressed as follows. An exhaust purification control device for an internal combustion engine is a control device for an exhaust gas control apparatus provided to an internal combustion engine, the exhaust gas control apparatus including: a first NOx catalyst provided in an exhaust passage of the internal combustion engine; a hydrocarbon addition valve configured to add hydrocarbon to exhaust gas flowing into the first NOx catalyst; a second NOx catalyst provided in a downstream of the first NOx catalyst, and a urea addition valve provided between the first NOx catalyst and the second NOx catalyst in the exhaust passage. The first NOx catalyst has characteristics in which NOx in the exhaust gas is reduced when a hydrocarbon concentration in the exhaust gas flowing into the first NOx catalyst changes to fluctuate with an amplitude within a prescribed range at a time interval within a prescribed range and a storage amount of NOx increases when the time interval becomes longer than a value within the prescribed range. The control device includes an electronic control unit configured to i) execute a first purification process, the first purification process being a process of purifying NOx by intermittently adding the hydrocarbon into the exhaust gas from the hydrocarbon addition valve and changing the hydrocarbon concentration in the exhaust gas flowing into the first NOx catalyst to fluctuate with the amplitude within the prescribed range at the time interval within the prescribed range, ii) execute a second purification process, the second purification process being a process of purifying NOx by use of the second NOx catalyst by adding urea water into the exhaust gas from the urea addition valve, and iii) execute a hydrocarbon poisoning recovery stand-by process, the hydrocarbon poisoning recovery stand-by process being a process of, at a time when an execution request of the second purification process is generated during execution of the first purification process, reducing an additive amount per once from the hydrocarbon addition valve as compared with an additive amount per once before the execution request is generated, prior to start of execution of the second purification process.

In the above configuration, on the condition that the execution request of the second purification process is generated during execution of the first purification process, a HC poisoning recovery stand-by process, which is a process of reducing an additive amount per once in the first purification process, is executed prior to the start of execution of the second purification process. Here, by the execution of the first purification process, an amount of hydrocarbon slipping into the downstream of the first NOx catalyst decreases by reducing the additive amount of hydrocarbon per once. On this account, when the HC poisoning recovery stand-by process is executed, the amount of hydrocarbon flowing into the second NOx catalyst can be reduced. In a case where the first purification process is performed, a temperature of the exhaust gas flowing into the second NOx catalyst is high. Accordingly, even if the second NOx catalyst is HC-poisoned at the time when the execution request is generated, the second NOx catalyst can be recovered from HC poisoning by reducing an amount of hydrocarbon newly flowing therein.

On this account, it is possible to restrain shifting from a state where the first purification control is executed but the second purification process is not executed to a state where the second purification process is executed in a state where a purification ability of the second purification process decreases.

2. In the exhaust purification control device for the internal combustion engine according to "1," the HC poisoning recovery stand-by process is a process of reducing the additive amount per once in the first purification process as compared with an additive amount per once before the execution request is generated, and shortening the time interval for the intermittent addition of the hydrocarbon as compared with a time interval before the execution request is generated. The electronic control unit may be configured to, as the hydrocarbon poisoning recovery stand-by process, reduce the additive amount per once as compared with the additive amount per once before the execution request is generated, and shorten the time interval for the intermittent addition of the hydrocarbon as compared with a time interval before the execution request is generated.

When the additive amount per once is reduced in the first purification process, there is such a tendency that a NOx purification rate decreases as compared with a case where the additive amount per once is not reduced. In that case, when the time interval for addition is shortened, a reduction effect of a slip amount of hydrocarbon into the downstream of the first NOx catalyst is yielded due to the reduction of the addition amount per once while the decrease in the NOx purification rate is restrained, which is found by the inventor(s). In the above configuration, in view of this property, the time interval for addition is shortened so as to restrain the decrease in the NOx purification rate by the HC poisoning recovery stand-by process.

3. In the exhaust purification control device for the internal combustion engine according to "2," the HC poisoning recovery stand-by process is a process of increasing, by the process of shortening the time interval, a consumption rate of the hydrocarbon by the first purification process as compared with a consumption rate of the hydrocarbon before the execution request is generated, and the consumption rate is an additive amount of the hydrocarbon per unit time. The electronic control unit may be configured to reduce the time interval as the hydrocarbon poisoning recovery stand-by process, such that a consumption rate of the hydrocarbon increases as compared with a consumption rate before the execution request is generated, and the consumption rate is an additive amount of the hydrocarbon per unit time.

In a case where the consumption rate of hydrocarbon is constant, when the additive amount per once is reduced to be lower than an amount that maximizes the purification rate of the first purification process, the purification rate of the first purification process decreases. However, even in a case where the additive amount per once is reduced, if the consumption rate of hydrocarbon is increased, the purification rate tends to increase, which is found by the inventor(s). In view of this point, in the above configuration, by increasing the consumption rate of hydrocarbon in the HC poisoning recovery stand-by process, it is possible to restrain the decrease in the NOx purification rate as much as possible.

4. In the exhaust purification control device for the internal combustion engine according to any one of "1" to "3," in a case where the HC poisoning recovery stand-by process is executed, when a temperature of the second NOx catalyst is high, the first purification portion decreases a reduction amount of the additive amount per once, as compared with a reduction amount at the time when the temperature of the second NOx catalyst is low. The electronic control unit may be configured to execute the hydrocarbon poisoning recovery stand-by process, such that a reduction amount of the additive amount per once at a time when a temperature of the second NOx catalyst is high is smaller than a reduction amount of the additive amount per once at a time when the temperature of the second NOx catalyst is low.

The more the reduction amount of the additive amount per once is, the more the amount of hydrocarbon slipping into the downstream of the first NOx catalyst can be reduced. Meanwhile, the NOx purification rate by the first purification process (the HC poisoning recovery stand-by process) tends to decrease more. In the meantime, in a case where the temperature of the second NOx purification catalyst is high, it is possible to further reduce hydrocarbon in the second NOx catalyst by oxidation in comparison with a case where the temperature is low. Based on such a point, in the above configuration, by increasing the additive amount per once at the time when the temperature of the second NOx catalyst is high, it is possible to recover the second NOx catalyst from HC poisoning and to restrain the decrease in the purification rate by the HC poisoning recovery stand-by process.

5. The exhaust purification control device for the internal combustion engine according to any one of "1" to "4" includes a poisoning amount calculation portion configured to calculate a HC poisoning amount of the second NOx catalyst, and in a case where the HC poisoning recovery stand-by process is executed, the first purification portion increases the reduction amount of the additive amount per once at the time when the HC poisoning amount is large in comparison with the reduction amount at the time when the HC poisoning amount is small. The electronic control unit may be configured to calculate a hydrocarbon poisoning amount of the second NOx catalyst, and execute the hydrocarbon poisoning recovery stand-by process such that a reduction amount of the additive amount per once at a time when the hydrocarbon poisoning amount is large is larger than a reduction amount of the additive amount per once at a time when the hydrocarbon poisoning amount is small.

The more the reduction amount of the additive amount per once is, the more the amount of hydrocarbon slipping into the downstream of the first NOx catalyst can be reduced. Accordingly, the second NOx catalyst can be easily recovered from HC poisoning. In the meantime, in a case where the additive amount and the time interval by the HC poisoning recovery stand-by process are the same, it takes a longer time for the second NOx catalyst to recover from HC poisoning when the HC poisoning amount of the second NOx catalyst is large, in comparison with the time when the HC poisoning amount of the second NOx catalyst is small. In view of this point, in the above configuration, the reduction amount of the additive amount per once at the time when the HC poisoning amount is large is increased, as compared with the reduction amount at the time when the HC poisoning amount is small. It is possible to restrain the time required for the second NOx catalyst to recover from HC poisoning from being long due to the large HC poisoning amount.

6. The exhaust purification control device for the internal combustion engine according to any one of "1" to "5" includes a poisoning amount calculation portion configured to calculate a HC poisoning amount of the second NOx catalyst, and a second purification rate calculation portion configured to, when the first purification process is executed, calculate a second purification rate based on the HC poisoning amount, the second purification rate being a NOx purification rate by the second purification process on the assumption that the second purification process is executed. At the time when the first purification process is executed and an execution request of the second purification process is generated, the second purification portion does not execute the second purification process on the condition that the second purification rate is less than a prescribed value. When the second purification process is not executed on the condition that the second purification rate is less than the prescribed value, the first purification portion executes the HC poisoning recovery stand-by process. The electronic control unit may be configured such that: the electronic control unit calculates the hydrocarbon poisoning amount of the second NOx catalyst; the electronic control unit calculates a second purification rate based on the hydrocarbon poisoning amount during the execution of the first purification process, the second purification rate being an estimate of a NOx purification rate of the second purification process; when the first purification process is executed and the execution request of the second purification process is generated, the electronic control unit does not execute the second purification process on a condition that the second purification rate is less than a prescribed value; and when the second purification process is not executed on the condition that the second purification rate is less than the prescribed value, the electronic control unit executes the hydrocarbon poisoning recovery stand-by process.

In the above configuration, even in a case where the execution request of the second purification process is generated during execution of the first purification process, the second purification process is not executed on the condition that the second purification rate is less than a prescribed value. On this account, it is possible to restrain the second purification process from being executed when the purification ability of the second purification process decreases due to HC poisoning of the second NOx catalyst.

7. The exhaust purification control device for the internal combustion engine according to "6" includes a first purification rate calculation portion configured to calculate a first purification rate, which is a NOx purification rate by the first purification process currently executed, the prescribed value is the first purification rate, and in a case where the second purification rate is the first purification rate or more by executing the HC poisoning recovery stand-by process, the second purification process is executed and the execution of the first purification process is stopped. The electronic control unit may be configured to calculate a first purification rate, which is a NOx purification rate of the first purification process, the prescribed value is the first purification rate, and the electronic control unit is configured to, when the second purification rate is equal to or larger than the first purification rate due to execution of the hydrocarbon poisoning recovery stand-by process, execute the second purification process and stop the execution of the first purification process.

In the above configuration, when the first purification rate is higher than the second purification rate, the HC poisoning recovery stand-by process is executed, and when the second purification rate is the first purification rate or more, the first purification process is stopped. This makes it possible to limit an execution period of the HC poisoning recovery stand-by process having a lower purification efficiency than the first purification process in a normal time. In the meantime, since the second purification process is executed at the time when the second purification rate is the first purification rate or more, the second purification process is not started in a state where the purification ability of the second purification process is low. On this account, it is possible to increase the use efficiency of hydrocarbon and urea water as high as possible and to increase the NOx purification rate as high as possible, in a well-balanced manner.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

The following describes a first embodiment of an exhaust purification control device for an internal combustion engine with reference to the drawings.

Figure 1:
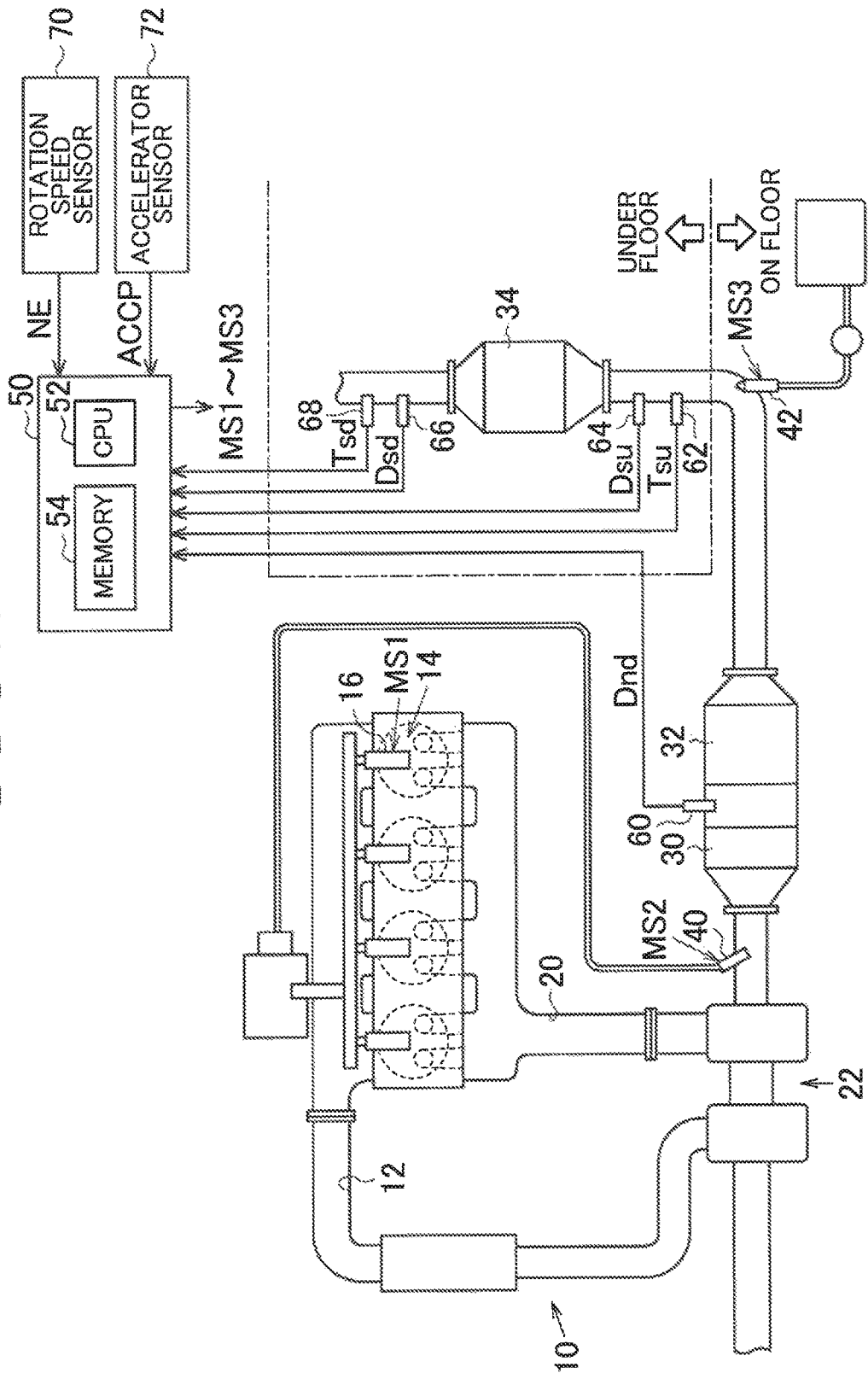
FIG. 1 is a view illustrating a first embodiment of an exhaust purification control device and an internal combustion engine.

The air taken from an intake passage 12 of a compression-ignition internal combustion engine 10 illustrated in FIG. 1 flows into a combustion chamber 14 of each cylinder, so that a fuel/air mixture of the air and fuel (light oil) injected from a fuel injection valve 16 is subjected to combustion in the combustion chamber 14. The fuel/air mixture thus subjected to combustion is discharged as exhaust gas to an exhaust passage 20. A first catalyst 30 and a diesel particulate filter (DPF 32) are sequentially provided in this order in the downstream of a supercharger 22 in the exhaust passage 20, and a urea SCR (a second catalyst 34) is provided in the downstream of the DPF 32. Note that, in the present embodiment, the combustion chamber 14, the first catalyst 30, the DPF 32, and the like are placed on an upper side (on a floor) relative to a floor surface of a vehicle in an up-down direction of the vehicle, while the second catalyst 34 is placed on a lower side (under the floor) relative to the floor surface of the vehicle.

The first catalyst 30 is configured such that catalyst particles of noble metal are carried by a catalytic carrier, and further, a basic layer is carried by the catalytic carrier. Here, alumina and the like can be used as the catalytic carrier, for example, platinum and rhodium can be used as the catalyst particles, for example, and alkali metal, alkaline earth metal, and the like can be used as the basic layer. The first catalyst 30 has characteristics in which NOx in exhaust gas flowing into the first catalyst 30 is reduced by fluctuating a hydrocarbon concentration in the exhaust gas with an amplitude within a prescribed range (e.g., from 200 to 10000 ppm) at a time interval within a prescribed range (e.g., 0.3 to 5 seconds) and a NOx storage amount is increased when the time interval is made longer than a value within the prescribed range.

When the hydrocarbon concentration in the exhaust gas flowing into the first catalyst 30 is fluctuated as described above, it is possible to limit a length of a period for which the HC concentration in the exhaust gas flowing into the first catalyst 30 is low. Hereby, after NO in the exhaust gas is oxidized to generate nitrogen dioxide having activity but before the nitrogen dioxide is stored in the first catalyst 30 in the form of nitrate, the HC concentration is increased, thereby making it possible to produce a reducing intermediate in the first catalyst 30. When the HC concentration in the exhaust gas decreases again and an oxygen concentration increases, the reducing intermediate is reacted with the nitrogen dioxide having activity, so that NOx is purified. Note that this control and a mechanism of NOx purification are described in Japanese Patent No. 4893876, for example.

A hydrocarbon addition valve 40 that adds hydrocarbon into the exhaust gas by injecting light oil into the exhaust gas is provided between the supercharger 22 and the first catalyst 30. Further, a urea addition valve 42 that adds urea water into the exhaust gas is provided between the DPF 32 and the second catalyst 34.

A control device (Electronic Control Unit) 50 is targeted for the internal combustion engine 10 as a controlled object, and in order to operate actuators for the fuel injection valve 16, the hydrocarbon addition valve 40, the urea addition valve 42, and the like to control a controlled amount (torque, exhaust-gas compositions) of the internal combustion engine 10, the control device 50 outputs operation signals MS1 to MS3. The control device 50 includes a central processing unit (CPU 52) and a memory 54, and controls the controlled amount such that the CPU 52 executes a program stored in the memory 54.

At this time, the CPU 52 refers to respective output values of an NOx concentration sensor 60 that detects an NOx concentration Dnd in the exhaust gas between the first catalyst 30 and the DPF 32, an exhaust-gas temperature sensor 62 that detects a temperature Tsu of the exhaust gas between the DPF 32 and the second catalyst 34, and an NOx concentration sensor 64 that detects an NOx concentration Dsu in the exhaust gas between the DPF 32 and the second catalyst 34. Further, the CPU 52 refers to respective output values of an NOx concentration sensor 66 that detects an NOx concentration Dsd in the exhaust gas in the downstream of the second catalyst 34, an exhaust-gas temperature sensor 68 that detects a temperature Tsd of the exhaust gas in the downstream of the second catalyst 34, a rotation speed sensor 70 that detects a rotation speed NE of a crank shaft, and an accelerator sensor 72 that detects an operation amount ACCP of an accelerator pedal.

The control device 50 selectively uses the first catalyst 30 and the second catalyst 34 so as to execute an exhaust purification control. That is, in a case where the temperature of the exhaust gas is less than a specified temperature (e.g., 350° C.), an exhaust air-fuel ratio is kept leaner than a theoretical air-fuel ratio so as to store NOx in the first catalyst 30, and when an amount of the NOx thus stored is large, a third purification process is executed such that hydrocarbon is added to the exhaust gas by the hydrocarbon addition valve 40 so as to purify the NOx thus stored by reduction with hydrocarbon. Further, when the temperature of the exhaust gas is not less than the specified temperature, a first purification process is executed such that the hydrocarbon addition valve 40 is operated so as to keep an average of the exhaust air-fuel ratio leaner than the theoretical air-fuel ratio and to fluctuate the concentration of hydrocarbon in the exhaust gas flowing into the first catalyst 30 with the amplitude within the prescribed range at the time interval within the prescribed range. Further, in a case where a NOx amount in the exhaust gas is too large and it is difficult to purify NOx by the first purification process, a second purification process of purifying NOx by use of the second catalyst 34 is executed by adding urea water into the exhaust gas from the urea addition valve 42.

Incidentally, in the above description, an exhaust air-fuel ratio of target exhaust gas is defined by use of a virtual fuel/air mixture. That is, the virtual fuel/air mixture is defined as a fuel/air mixture which is constituted only by fresh air and fuel and in which an unburned fuel concentration and an oxygen concentration of exhaust gas generated by burning the fuel/air mixture are the same as an unburned fuel concentration and an oxygen concentration of the target exhaust gas, and the exhaust air-fuel ratio is defined as an air-fuel ratio of the virtual fuel/air mixture. Note that the combustion of the virtual fuel/air mixture is not limited to combustion in which at least one of the unburned fuel concentration and the oxygen concentration is zero or a value that can be regarded as zero, and the combustion of the virtual fuel/air mixture includes combustion in which both the unburned fuel concentration and the oxygen concentration are larger than zero.

Figure 2:
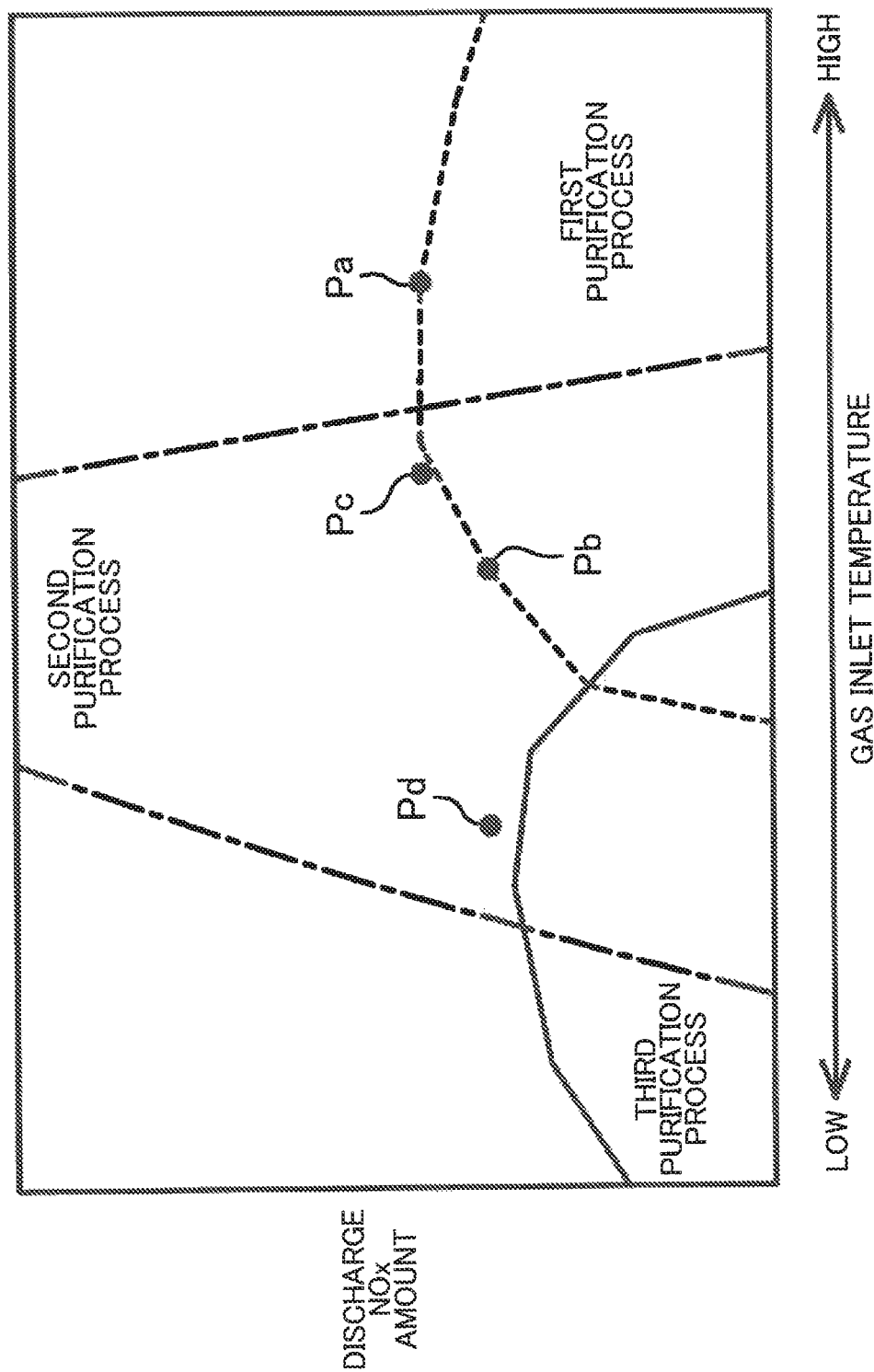
FIG. 2 is a view illustrating a purification ability depending on a type of an exhaust gas purification process.

FIG. 2 illustrates a NOx purification ability of the first catalyst 30 and a NOx purification ability of the second catalyst 34 in each region determined by a gas inlet temperature to the first catalyst 30 or the second catalyst 34 and an amount of NOx in exhaust gas to be discharged from the combustion chamber 14 per unit time. Note that the NOx purification using the first catalyst 30 includes the first purification process and the third purification process. In FIG. 2, in a case where the gas inlet temperature to the second catalyst 34 and the amount of NOx in the exhaust gas fall within a region of the second purification process surrounded by an alternate long and short dash line, for example, it means that NOx in the exhaust gas can be sufficiently removed by the second purification process.

Incidentally, since the second catalyst 34 is placed on the downstream side relative to the first catalyst 30, the gas inlet temperature of the second catalyst 34 is lower than the gas inlet temperature of the first catalyst 30. Particularly, in the present embodiment, the first catalyst 30 is placed on the floor, while the second catalyst 34 is placed under the floor. Accordingly, the above tendency is remarkably shown, and the gas inlet temperature of the second catalyst 34 could be lower than the gas inlet temperature of the first catalyst 30 by about 100° C., for example. This is because the second catalyst 34 more easily receives travel wind in comparison with a case where it is placed on the floor, for example. On this account, even in a case where the temperature of the exhaust gas discharged from the combustion chamber 14 is high, the gas inlet temperature of the second catalyst 34 falls within a temperature range where the second catalyst 34 can demonstrate NOx purification ability.

Figure 3:
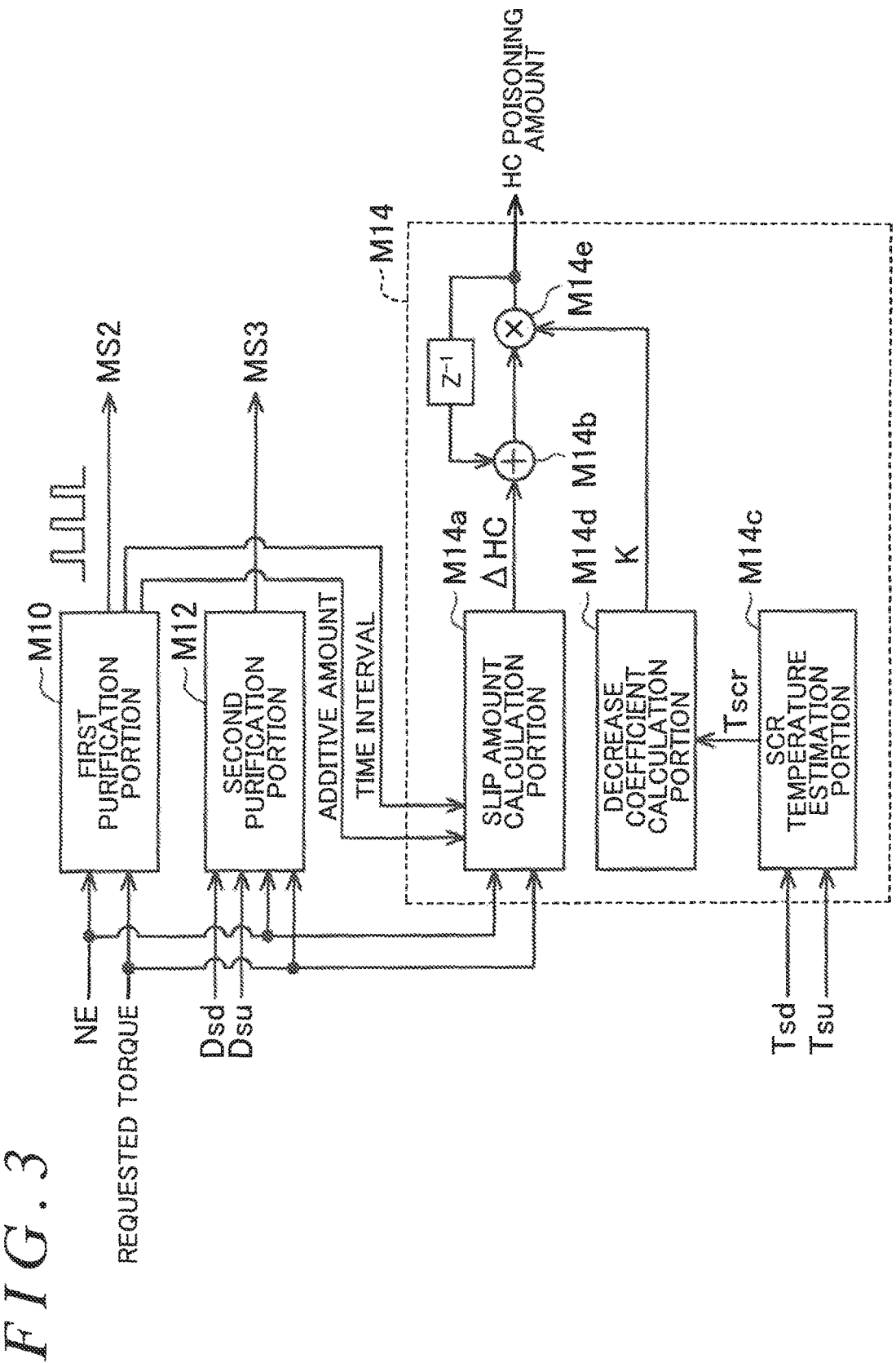
FIG. 3 is a block diagram illustrating a part of a process of a control device according to the embodiment.

FIG. 3 illustrates a part of a process to be implemented when the CPU 52 executes a program stored in the memory 54. A first purification portion M10 generates and outputs an operation signal MS2 of the hydrocarbon addition valve 40 to execute the first purification process, based on a torque (requested torque) requested to the internal combustion engine 10 according to the rotation speed NE and the operation amount ACCP of the accelerator pedal. The operation signal MS2 is a signal to cause the hydrocarbon addition valve 40 to intermittently add hydrocarbon, and particularly, a signal to operate an additive amount per once from the hydrocarbon addition valve 40 and a time interval for addition so as to fluctuate the hydrocarbon concentration in the exhaust gas flowing into the first catalyst 30 with the amplitude within the prescribed range at the time interval within the prescribed range. The first purification portion M10 sets the additive amount and the time interval for addition so as to achieve a highest purification rate, except the time of an HC poisoning recovery stand-by process (described later). Here, the purification rate indicates a ratio of a purified NOx amount to a NOx amount in the exhaust gas flowing into a catalyst (the first catalyst 30 herein) to be used.

Figure 4:
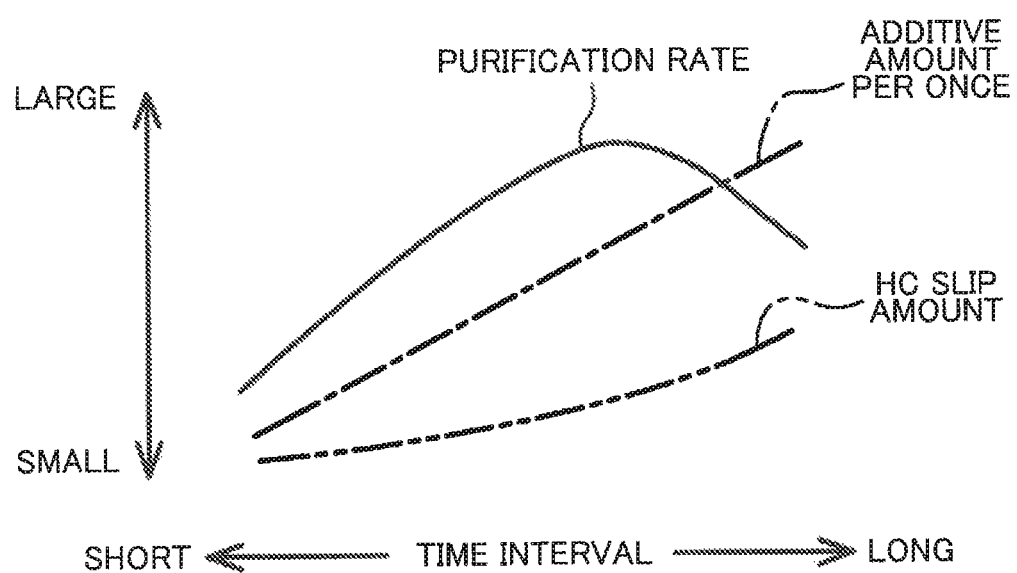
FIG. 4 is a view to describe characteristics of a first purification process according to the embodiment.

FIG. 4 illustrates a relationship between the additive amount per once, the time interval for addition, and the purification rate. The additive amount per once, as indicated by an alternate long and short dash line in FIG. 4, indicates a value at which a consumption rate of hydrocarbon with a hydrocarbon additive amount per unit time becomes constant regardless of the time interval for addition. In other words, the additive amount per once indicates a value at which the consumption rate, which is a value obtained by dividing the additive amount per once by the time interval for addition, becomes constant regardless of the time interval for addition. In this case, the purification rate reaches its maximum when the additive amount and the time interval for addition are predetermined values. However, the additive amount and the time interval that achieve the maximum purification rate change depending on a flow rate of the exhaust gas flowing into the first catalyst 30, a temperature of the exhaust gas, and the NOx amount in the exhaust gas. Because of this, the first purification portion M10 variably sets the additive amount per once and the time interval for addition depending on the rotation speed NE and the requested torque. Here, the rotation speed and the requested torque are parameters to determine the flow rate of the exhaust gas flowing into the first catalyst 30, the temperature of the exhaust gas, and the NOx amount in the exhaust gas. In the present embodiment, the flow rate of the exhaust gas flowing into the first catalyst 30, the temperature of the exhaust gas, and the NOx amount in the exhaust gas are regarded to have a one-to-one correspondence with the rotation speed NE and the requested torque. Note that, in FIG. 4, an alternate long and two short dashes line indicates a slip amount (referred to as a HC slip amount in FIG. 4) of hydrocarbon into the downstream of the first catalyst 30 according to the additive amount per once and the time interval for addition.

Referring back to FIG. 3, a second purification portion M12 generates and outputs an operation signal MS3 to operate the urea addition valve 42, based the NOx concentration Dsu on the upstream side of the second catalyst 34, the NOx concentration Dsd on the downstream side thereof, the rotation speed NE, and the requested torque. Basically, the second purification portion M12 injects, from the urea addition valve 42 to the exhaust gas, a necessary amount of urea water to supply, to the second catalyst 34, an appropriate amount of ammonia that reacts with NOx flowing into the second catalyst 34, based on the rotation speed NE, the requested torque, and the NOx concentration Dsu. In the following description, this amount of urea water may be referred to as a reaction equivalent amount. Here, the rotation speed NE and the requested torque are parameters to determine an amount of the exhaust gas flowing into the second catalyst 34. Further, in a case where a decrease amount of the NOx concentration Dsd with respect to the NOx concentration Dsu is small, the second purification portion M12 increases the amount of urea water to be injected from the urea addition valve 42, with respect to the reaction equivalent amount.

A poisoning amount calculation portion M14 calculates a HC poisoning amount of the second catalyst 34 due to hydrocarbon slipping into the downstream of the first catalyst 30 during execution of the first purification process. More specifically, a slip amount calculation portion M14a calculates a slip amount ΔHC from the first catalyst 30 based the rotation speed NE, the requested torque, and the additive amount per once and the time interval set by the first purification portion M10. The purification rate of the first purification process is determined by the flow rate of the exhaust gas flowing into the first catalyst 30, the temperature of the exhaust gas, the NOx amount in the exhaust gas, the additive amount per once, and the time interval for addition. Accordingly, the slip amount ΔHC is also determined by the same five parameters. The slip amount calculation portion M14a determines the flow rate of the exhaust gas flowing into the first catalyst 30, the temperature of the exhaust gas, and the NOx amount in the exhaust gas according to the rotation speed NE and the requested torque.

More specifically, a four-dimensional map which takes the rotation speed NE, the requested torque, the additive amount per once, and the time interval as input variables and which takes the slip amount ΔHC as an output variable may be stored in the memory 54, for example, so that the CPU 52 performs map calculation to find the slip amount ΔHC by use of the four-dimensional map. Here, the map is data showing a set of respective discrete values of the input variables and its corresponding discrete value of the output variable. Note that, in a case where a value of an actual input variable on calculating a value of the output variable does not correspond to any values of the input variables stored in the map, the CPU 52 calculates the value of the output variable by interpolation calculation.

An addition portion M14b adds the slip amount ΔHC to a HC poisoning amount calculated by the poisoning amount calculation portion M14 in a previous control period. An SCR temperature estimation portion M14c estimates a temperature Tscr of the second catalyst 34 based on an upstream temperature Tsu and a downstream temperature Tsd of the second catalyst 34. Herein, a moving average of the upstream temperature Tsu and the downstream temperature Tsd is assumed the temperature Tscr, for example. Note that the moving average here can be assumed a simple moving average or a weighting moving average.

A decrease coefficient calculation portion M14d calculates a decrease coefficient K of the HC poisoning amount of the second catalyst 34 based on the temperature Tscr of the second catalyst 34. Here, the decrease coefficient K is a value not less than "0" but not more than "1," and is set to a smaller value as the temperature Tscr of the second catalyst 34 is higher. This takes it into consideration that the higher a speed of oxidization and removal of hydrocarbon in the second catalyst 34 is, the higher the temperature of the second catalyst 34 is.

A multiplication portion M14e outputs a value obtained by multiplying an output value of the addition portion M14b by the decrease coefficient K as the HC poisoning amount calculated by the poisoning amount calculation portion M14. Next will be described a switch process from the first purification process to the second purification process.

Figure 5:
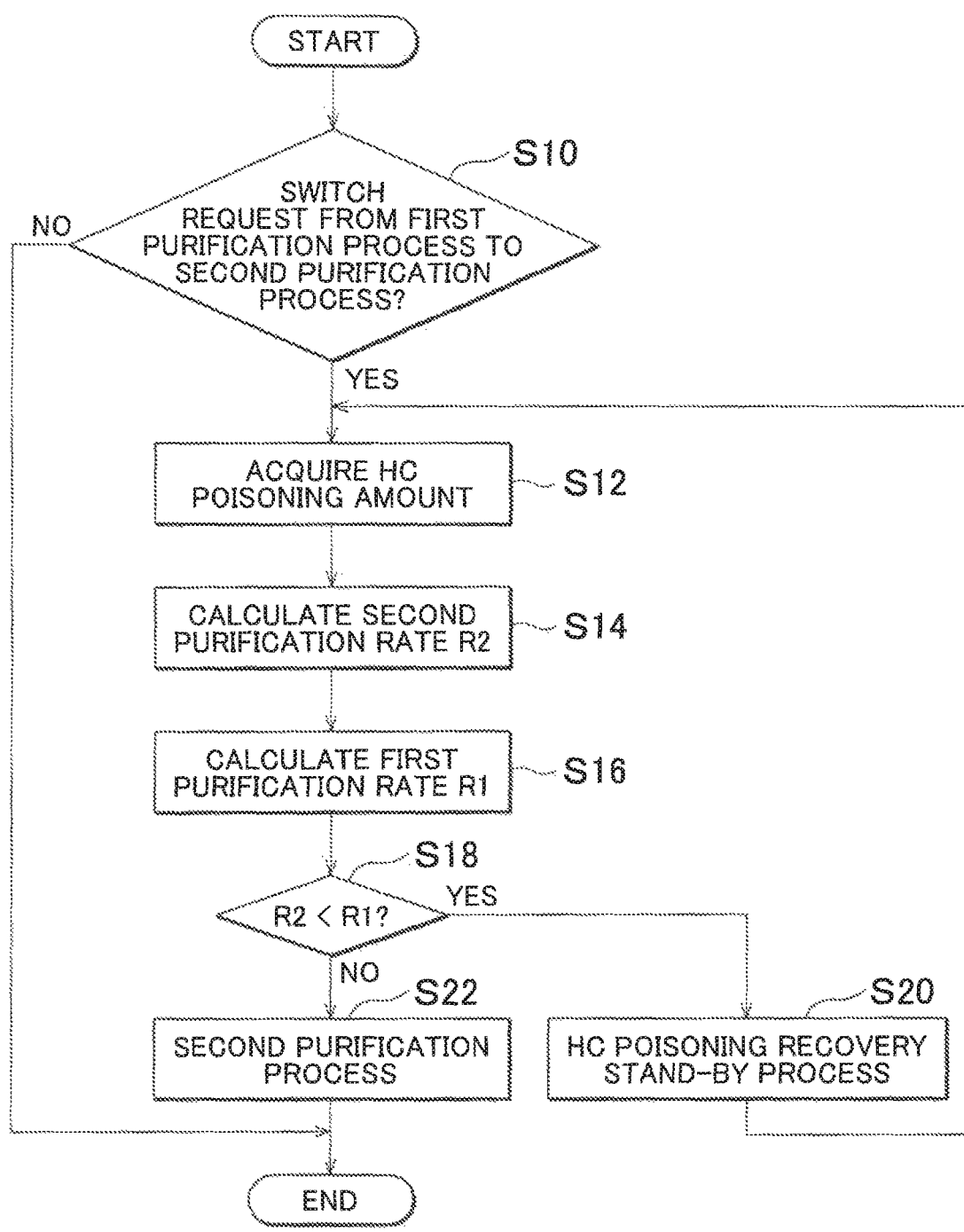
FIG. 5 is a flow chart illustrating a procedure of a process related to switching to a second purification process according to the embodiment.

A procedure of the switch process is illustrated in FIG. 5. The process illustrated in FIG. 5 is implemented when the CPU 52 executes a program stored in the memory 54. The process illustrated in FIG. 5 is executed repeatedly every time a predetermined condition is established, for example. Here, the predetermined condition includes a condition that the first purification process is executed.

In a series of processes illustrated in FIG. 5, the CPU 52 first determines whether or not a switch request from the first purification process to the second purification process is generated (S10). During execution of the first purification process, when the CPU 52 determines that the amount of NOx in the exhaust gas is an amount of NOx that cannot be sufficiently purified by the first purification process, the CPU 52 determines that the switch request is generated. In the present embodiment, when the NOx concentration Dnd in the exhaust gas in the downstream of the first catalyst 30, detected by the NOx concentration sensor 60, is a threshold or more, the CPU 52 determines that the switch request is generated based on that.

When the CPU 52 determines that the switch request is generated (S10: YES), the CPU 52 acquires a latest value of the HC poisoning amount that is calculated each time by the poisoning amount calculation portion M14 (S12). Subsequently, the CPU 52 calculates a second purification rate R2, which is a purification rate by the second purification process when it is assumed that the first purification process is stopped and the second purification process is executed (S14). Here, the CPU 52 calculates a purification rate when it is assumed that urea water of the reaction equivalent amount is added by the urea addition valve 42 in the second purification process. More specifically, in the present embodiment, the CPU 52 calculates the second purification rate R2 by performing a decrease correction on a base value (fixed value) of the purification rate, stored in the memory 54, depending on the HC poisoning amount. Here, the base value is assumed a purification rate in a temperature region where the second catalyst 34 can demonstrate a high purification ability. In the present embodiment, this setting is made in consideration that the gas inlet temperature to the second catalyst 34 at the time when the switch request is generated is within the temperature region where the second catalyst 34 can demonstrate its purification ability. The decrease correction of the base value is performed such that a decrease correction amount of the base value is larger as the HC poisoning amount is larger, so that the second purification rate R2 has a small value. Hereby, it is possible to express appropriately that the larger the HC poisoning amount, the lower the purification ability of the second catalyst 34. This process is performable such that a one-dimensional map that determines a relationship between the HC poisoning amount and a correction coefficient is stored in the memory 54 and the base value is multiplied by a correction coefficient calculated from the one-dimensional map.

Note that the poisoning amount calculation portion M14 calculates the HC poisoning amount of the second catalyst 34 based on an amount of hydrocarbon slipping from the first catalyst 30 during execution of the first purification process, but does not take into consideration a slip amount of hydrocarbon from the first catalyst 30 while hydrocarbon is added by the hydrocarbon addition valve 40 in the third purification process. However, in the present embodiment, the slip amount during execution of the third purification process can be ignored on the occasion of the calculation of the HC poisoning amount of the second catalyst 34 at the time when the switch request to the second purification process is generated. This is because the slip amount of hydrocarbon from the first catalyst 30 is small while hydrocarbon is added by the hydrocarbon addition valve 40 in the third purification process, and in addition to that, the third purification process does not directly shift to the second purification process. That is, when the temperature of the exhaust gas increases, the third purification process shifts to the first purification process, and when NOx cannot be sufficiently purified by the first purification process, it shifts to the second purification process. Here, in a case where the first purification process is executed, the influence of the HC poisoning amount during execution of the third purification process, out of the HC poisoning amount of the second catalyst 34, decreases due to a high temperature of the exhaust gas during execution of the first purification process. On this account, the HC poisoning amount during execution of the third purification process barely contributes to the HC poisoning amount of the second catalyst 34 at the time when the switch request to the second purification process is generated.

Subsequently, the CPU 52 calculates a first purification rate R1, which is a NOx purification rate of the first purification process currently executed (S16). This is a process in which the CPU 52 calculates the first purification rate R1 from the rotation speed NE, the requested torque, the additive amount per rotation, and the time interval for addition. More specifically, a four-dimensional map which takes the rotation speed NE, the requested torque, the additive amount per once, and the time interval as input variables and which takes the first purification rate R1 as an output variable is stored in the memory 54 in advance, and the CPU 52 calculates the first purification rate R1 by use of the map. Note that the rotation speed NE and the requested torque are parameters to determine the flow rate of the exhaust gas flowing into the first catalyst 30, the temperature of the exhaust gas, and the NOx amount in the exhaust gas.

Then, the CPU 52 determines whether or not the first purification rate R1 is higher than the second purification rate R2 (S18). Then, when it is determined that the first purification rate R1 is higher than the second purification rate R2 (S18: YES), the CPU 52 executes the HC poisoning recovery stand-by process (S20). This will be described below with reference to FIG. 6.

Figure 6:
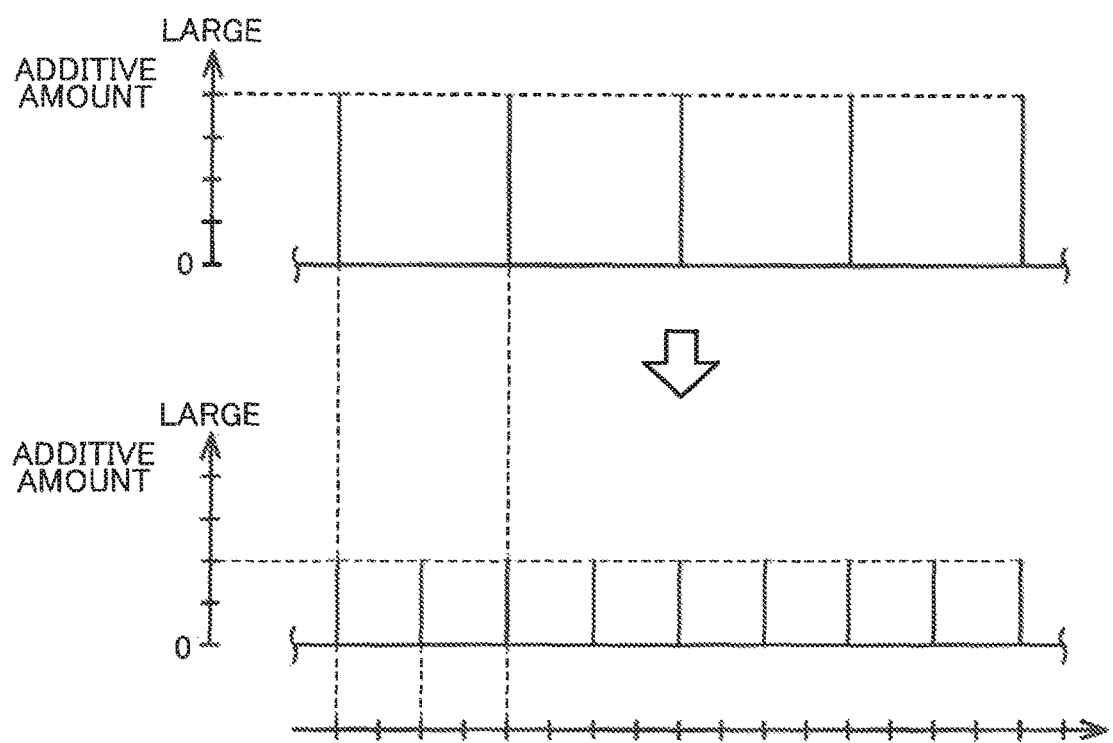
FIG. 6 is a time chart illustrating a HC poisoning recovery stand-by process according to the embodiment.

An upper diagram of FIG. 6 illustrates a transition of a hydrocarbon addition process in the first purification process in a normal time, which is not the HC poisoning recovery stand-by process, and a lower diagram of FIG. 6 illustrates a transition of a hydrocarbon addition process in the HC poisoning recovery stand-by process. Here, the upper diagram of FIG. 6 and the lower diagram of FIG. 6 illustrate the transitions of the process at the same operating point of the internal combustion engine 10, which is determined by the rotation speed NE and the requested torque. Note that, in FIG. 6, the additive amount per once and the time interval for addition are illustrated schematically, and the time when the additive amount per once is added does not have a width for simplification.

In the HC poisoning recovery stand-by process illustrated in the lower diagram of FIG. 6, the additive amount per once is small in comparison with the first purification process in the normal time as illustrated in the upper diagram of FIG. 6. This is in consideration that an amount of hydrocarbon slipping into the downstream of the first catalyst 30 during execution of the first purification process has a strong positive correlation with the additive amount per once. On this account, as illustrated in the lower diagram of FIG. 6, by reducing the additive amount per once, the slip amount of hydrocarbon into the downstream of the first catalyst 30 is reduced effectively.

Further, in the HC poisoning recovery stand-by process illustrated in the lower diagram of FIG. 6, the time interval for addition is shortened in comparison with the first purification process in the normal time as illustrated in the upper diagram of FIG. 6. This is to compensate, to some extent, the decrease of the purification rate due to the reduction in the additive amount per once, so as to restrain a decrease of the purification rate of the HC poisoning recovery stand-by process with respect to the purification rate of the first purification process in the normal time. That is, in the first purification process in the normal time, the additive amount per once and the time interval for addition are set based on the rotation speed NE and the requested torque, so that the purification rate is maximum. On this account, when the additive amount per once is reduced, the purification rate decreases due to the reduction. However, at this time, in a case where the time interval for addition is shortened, it is possible to restrain the decrease of the purification rate in comparison with a case where the time interval for addition is not shortened. Note that the lower diagram of FIG. 6 describes an example in which the additive amount per once is set to "½" and the time interval for addition is set to "½" relative to those of the first purification process in the normal time as illustrated in the upper diagram of FIG. 6. However, it is not intended to limit a specific value in the present embodiment by the value of "½." FIG. 6 schematically illustrates that the time interval is shortened so that the first purification process in the normal time and the HC poisoning recovery stand-by process have the same hydrocarbon consumption rate.

Note that the first purification process in the normal time and the HC poisoning recovery stand-by process can be implemented such that two types of each of the following two-dimensional maps are stored in the memory 54 in advance, i.e., two types of a two-dimensional map which takes the rotation speed NE and the requested torque as input variables and which takes the additive amount per once as an output variable, and two types of a two-dimensional map which takes the rotation speed NE and the requested torque as input variables and which takes the time interval for addition as the output variable. Here, values of the input variables of the two-dimensional maps for the first purification process in the normal time and values of the input variables of the two-dimensional maps for the HC poisoning recovery stand-by process partially overlap with each other. In the present embodiment, they are set as such because the switch request is generated when the NOx concentration Dnd is the threshold or more, but an operating point where the switch request is generated is not necessarily determined unambiguously. That is, due to this setting, the operating point determined by the values of the input variables of the two-dimensional maps for the first purification process in the normal time and the operating point determined by the values of the input variables of the two-dimensional maps for the HC poisoning recovery stand-by process partially overlap with each other. Accordingly, even if the operating point where the switch request is generated varies to some extent, it is possible to avoid such a problem that the operating point is not defined by the maps at the time when the HC poisoning recovery stand-by process should be executed.

Referring back to FIG. 5, when the CPU 52 executes the HC poisoning recovery stand-by process for a predetermined time, the CPU 52 returns to the process of step S12. Note that it is desirable that a period for which the poisoning amount calculation portion M14 calculates an HC poisoning amount be the predetermined time or less. In the meantime, when it is determined that the second purification rate R2 is the first purification rate R1 or more (S18: NO), the CPU 52 stops the first purification process and executes the second purification process (S22).

Note that, in a case of a negative determination in step S10 or in a case where the process of step S22 is completed, the CPU 52 finishes the series of processes illustrated in FIG. 5 once. Here, the effect of the present embodiment will be described.

In a case where the temperature of the exhaust gas reaches the specified temperature or more and the amount of NOx in the exhaust gas becomes large during execution of the first purification process, which causes an operating state of the internal combustion engine in which NOx cannot be sufficiently purified by the first purification process, the CPU 52 generates the switch request to the second purification process.

Here, as the case where the switch request is generated, the following assumes two cases with reference to FIG. 2. In FIG. 2, a point Pa and a point Pc have the same NOx discharge amount, and the gas inlet temperature is lower at the point Pc than at the point Pa. Further, a point Pb and a point Pd have the same NOx discharge amount and the gas inlet temperature is lower at the point Pd than at the point Pb. This reflects that the gas inlet temperature to the second catalyst 34 is lower than the gas inlet temperature to the first catalyst 30.

For example, in a case where the operating point of the internal combustion engine 10 at the time when the switch request is generated is a point corresponding to the point Pa illustrated in FIG. 2, the CPU 52 determines that the second purification rate R2 at the time when the switch request is generated is the first purification rate R1 or more, and immediately switches the process to the second purification process. The reason is as follows: in a case where an operating point at which the switch request is generated is a point corresponding to the point Pa, the gas inlet temperature of the first catalyst 30 is high, so the gas inlet temperature of the second catalyst 34 is a very high value at the point Pc. Therefore, the second catalyst 34 is in the temperature range where hydrocarbon can be removed by oxidization, and thus, HC poisoning of the second catalyst 34 can be ignored.

In the meantime, in a case where the operating point of the internal combustion engine 10 at the time when the switch request is generated is a point corresponding to the point Pb illustrated in FIG. 2, for example, the CPU 52 determines that the first purification rate R1 at the time when the switch request is generated is higher than the second purification rate R2, and immediately executes the HC poisoning recovery stand-by process without switching to the second purification process. Hereby, the additive amount per once is smaller than that of the first purification process in the normal time, thereby making it possible to decrease the amount of hydrocarbon slipping from the first catalyst 30. The gas inlet temperature of the second catalyst 34 at the time when the first purification process is executed is a value at the point Pd, which is high to some extent because the first purification process is executed. Accordingly, when the amount of hydrocarbon flowing into the second catalyst 34 decreases, the HC poisoning amount in the second catalyst 34 decreases.

Hereby, when the CPU 52 determines that the second purification rate R2 is the first purification rate R1 or more due to the decrease of the HC poisoning amount in the second catalyst 34, the CPU 52 stops the first purification process and executes the second purification process.

Note that, when the HC poisoning recovery stand-by process is executed along with the generation of the switch request from the first purification process to the second purification process, the operating point of the internal combustion engine 10 may come off from a region of the operating point determined by the two-dimensional maps for the first purification process in the normal time. However, even in this case, the additive amount per once at the start of execution of the HC poisoning recovery stand-by process is decreased from a previous additive amount per once. This is because the operating point at the time when the switch request is generated, among the operating points where the first purification process in the normal time is executed, is relatively close to the operating point at the start of execution of the HC poisoning recovery stand-by process. That is, the operating points similar to each other have similar additive amounts per once and similar time intervals for addition to optimize the purification rate. In the HC poisoning recovery stand-by process, the additive amount is reduced to be lower than the additive amount per once at which the purification rate is optimized, the additive amount per once at the start of execution of the HC poisoning recovery stand-by process is smaller than the previous additive amount per once.

Figure 7:
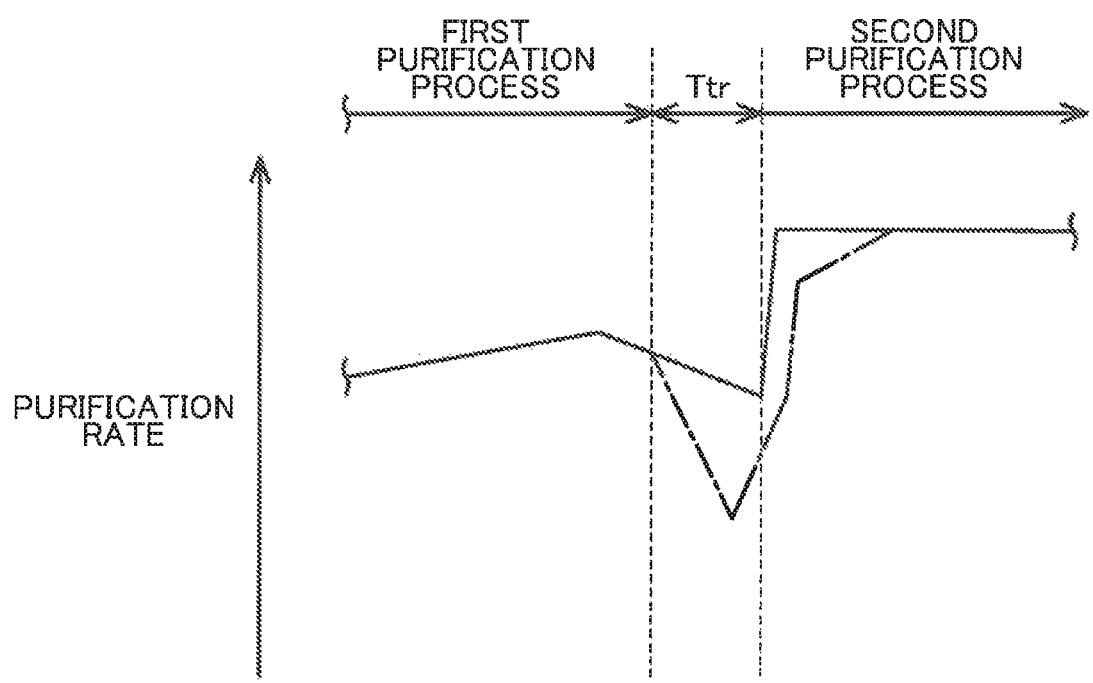
FIG. 7 is a time chart illustrating an effect of the embodiment.

FIG. 7 illustrates the transition of the purification rate of NOx in the present embodiment by a continuous line. This corresponds to a case where the HC poisoning recovery stand-by process is executed in a period Ttr illustrated in FIG. 7. In the meantime, an alternate long and short dash line indicates a transition of a purification rate in a comparative example in which the second purification process is executed in the period Ttr. In the comparative example, the process is switched to the second purification process, so that the purification rate greatly drops once. This is because the purification rate of the second catalyst 34 decreases because of HC poisoning of the second catalyst 34. In contrast, in the present embodiment, the HC poisoning recovery stand-by process is executed prior to the switch to the second purification process, so as to decrease the HC poisoning amount of the second catalyst 34, and when the NOx purification ability of the second catalyst 34 increases, the process is switched to the second purification process. Accordingly, it is possible to increase the NOx purification rate just after the switch to the second purification process. Although the HC poisoning recovery stand-by process has a NOx purification rate lower than that of the first purification process in the normal time, this decrease amount is smaller than the decrease of the NOx purification rate at the time of HC poisoning of the second catalyst 34.

According to the present embodiment described above, the following effects can be further obtained. (1) The CPU 52 reduces the additive amount per once and shortens the time interval for addition by the HC poisoning recovery stand-by process. By reducing the time interval for addition as such, it is possible to partially compensate a decrease in the NOx purification rate by the reduction of the additive amount per once and to restrain the decrease in the NOx purification rate by the HC poisoning recovery stand-by process.

(2) In a case where the second purification rate R2 is the first purification rate R1 or more by executing the HC poisoning recovery stand-by process, the CPU 52 executes the second purification process and stops execution of the first purification process. Hereby, it is possible to limit an execution period of the HC poisoning recovery stand-by process, which eventually makes it possible to increase the use efficiency of hydrocarbon and urea water as high as possible and to increase the NOx purification rate as high as possible, in a well-balanced manner. Note that the use efficiency of hydrocarbon is, for example, a parameter that becomes higher as the NOx purification amount with respect to the additive amount of hydrocarbon is larger.

(3) The first catalyst 30 is placed on the floor and the second catalyst 34 is placed under the floor. In this case, the gas inlet temperature of the second catalyst 34 during execution of the first purification process tends to decrease in comparison with a case where the second catalyst 34 is placed on the floor. On this account, in comparison with a case where the second catalyst 34 is placed on the floor, hydrocarbon slipping into the downstream of the first catalyst 30 during execution of the first purification process is not completely oxidized in the second catalyst 34 and the HC poisoning amount of the second catalyst 34 easily increases. In view of this, the utility value of the HC poisoning recovery stand-by process is particularly high.

Second Embodiment

The following describes the second embodiment mainly about differences from the first embodiment with reference to the drawings.

In the present embodiment, a reduction amount of an additive amount per once in a HC poisoning recovery stand-by process is smaller in a case where a temperature Tscr of a second catalyst 34 is high, as compared with a case where the temperature Tscr is low. This is the setting in consideration that the second catalyst 34 can remove a larger amount of hydrocarbon in the case where the temperature Tscr is high, as compared with the case where the temperature Tscr is low. The additive amount per once is set to a value that is as high as possible according to the temperature Tscr among values that can decrease a HC poisoning amount of the second catalyst 34.

More specifically, a first purification portion M10 sets an additive amount per once and a time interval for addition based on the temperature Tscr of the second catalyst 34 in addition to the rotation speed NE and the requested torque illustrated in FIG. 3. Note that the additive amount per once and the time interval for addition are set variably depending on the temperature Tscr only at the time of the HC poisoning recovery stand-by process, and in terms of a first purification process in a normal time, the additive amount per once and the time interval for addition are set variably by use of two-dimensional maps similar to the maps used in the first embodiment. In the meantime, for the HC poisoning recovery stand-by process, a three-dimensional map which takes the rotation speed NE, the requested torque, and the temperature Tscr as input variables and which takes the additive amount per once as an output variable, and a three-dimensional map which takes the rotation speed NE, the requested torque, and the temperature Tscr as input variables and which takes the time interval for addition as an output variable are stored in a memory 54. Here, the three-dimensional map that takes the additive amount per once as the output variable is a map in which, even if the rotation speed NE and the requested torque are the same values, the output variable takes a larger value in a case where a value of the temperature Tscr as the input variable is high, as compare with a case where the value of the temperature Tscr is small. Further, the three-dimensional map that takes the time interval for addition as the output variable is a map in which, even if the rotation speed NE and the requested torque are the same values, the output variable takes a larger value in a case where a value of the temperature Tscr as the input variable is high, as compared with a case where the value of the temperature Tscr is small.

Figure 8:
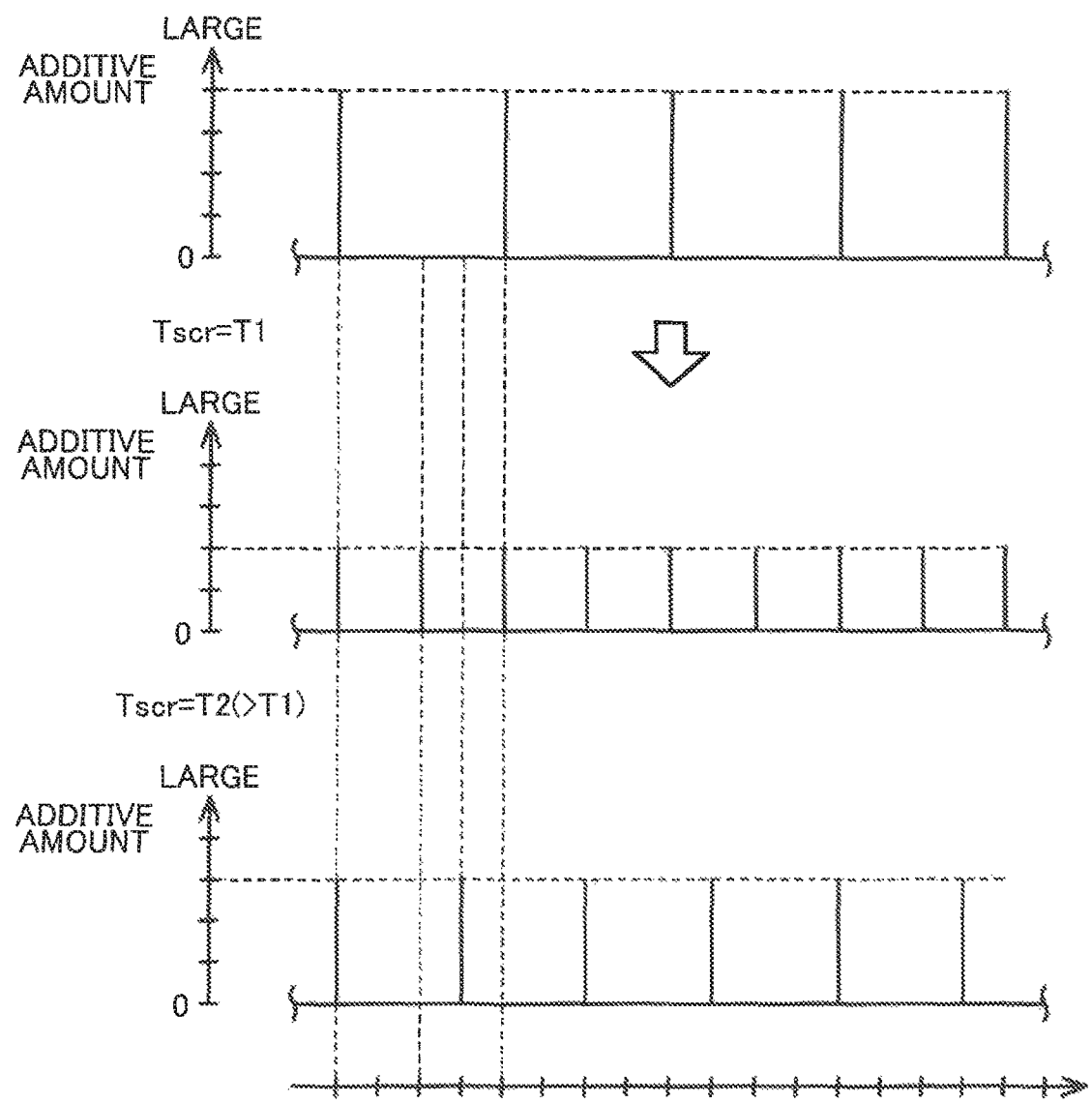
FIG. 8 is a time chart illustrating a HC poisoning recovery stand-by process according to a second embodiment.

FIG. 8 exemplifies the HC poisoning recovery stand-by process according to the present embodiment. Note that an upper diagram of FIG. 8 is the same as the upper diagram of FIG. 6, and an intermediate diagram of FIG. 8 illustrates an example in which the additive amount per once and the time interval for addition are set similarly to the lower diagram of FIG. 6 in a case where the temperature Tscr is a temperature T1. Further, a lower diagram of FIG. 8 illustrates an example in which the additive amount per once and the time interval for addition are set to "¾" of values in the first purification process in the normal time, as an example in which the temperature Tscr is a temperature T2, which is higher than the temperature T1. Respective diagrams of FIG. 8 illustrate a case where the process is performed at the same operating point. Even here, it is not intended to limit, by FIG. 8, magnifications of the additive amount per once and the time interval for addition of the HC poisoning recovery stand-by process with respect to the first purification process in the normal time. FIG. 8 schematically illustrates that the time interval is shortened so that the first purification process in the normal time and the HC poisoning recovery stand-by process have the same hydrocarbon consumption rate.

According to the present embodiment described above, a reduction amount of the additive amount per once is made smaller in the case where the temperature Tscr is high, as compared with the case where the temperature Tscr is low, thereby making it possible to restrain a decrease in the purification rate by the HC poisoning recovery stand-by process as much as possible.

Third Embodiment

The following describes the third embodiment mainly about differences from the second embodiment with reference to the drawings.

In the present embodiment, a reduction amount of an additive amount per once in a HC poisoning recovery stand-by process is made larger in a case where a HC poisoning amount of a second catalyst 34 is large at the start of the HC poisoning recovery stand-by process, as compared with a case where the HC poisoning amount is small. This is intended to restrain an execute time of the HC poisoning recovery stand-by process from becoming longer and to immediately shift to a second purification process. That is, in a case of the same slip amount of a first catalyst 30 by the HC poisoning recovery stand-by process, the time required to sufficiently decrease an HC poisoning amount is longer as a HC poisoning amount at the start of the HC poisoning recovery stand-by process is larger. On this account, in the case where the HC poisoning amount is large at the start of the HC poisoning recovery stand-by process, a reduction amount per once is made larger as compared with the case where the HC poisoning amount is small, thereby further decreasing a slip amount of hydrocarbon into the downstream of the first catalyst 30.

More specifically, a first purification portion M10 sets an additive amount and a time interval for addition based on the HC poisoning amount in addition to the rotation speed NE and the requested torque illustrated in FIG. 3, and a temperature Tscr of the second catalyst 34. Here, the HC poisoning amount is assumed a value at a point of time when a positive determination is made in step S10 of FIG. 5. Note that the additive amount per once and the time interval for addition are set variably depending on the temperature Tscr and the HC poisoning amount only at the time of the HC poisoning recovery stand-by process, and in terms of the first purification process in the normal time, the additive amount per once and the time interval for addition are set variably by use of two-dimensional maps similar to the maps used in the first embodiment. In this regard, for the HC poisoning recovery stand-by process, a four-dimensional map which takes the rotation speed NE, the requested torque, the temperature Tscr, and the HC poisoning amount as input variables and which takes the additive amount per once as an output variable, and a four-dimensional map which takes the rotation speed NE, the requested torque, the temperature Tscr, and the HC poisoning amount as input variables and which takes the time interval for addition as an output variable are stored in a memory 54.

Here, the four-dimensional map that takes the additive amount per once as the output variable is a map in which, even if the rotation speed NE, the requested torque, and the temperature Tscr are the same values, the output variable takes a smaller value in a case where the HC poisoning amount as the input variable is large, in comparison with a case where the HC poisoning amount is small. Further, the four-dimensional map that takes the time interval for addition as the output variable is a map in which, even if the rotation speed NE, the requested torque, and the temperature Tscr are the same values, the output variable takes a smaller value in a case where the value of the HC poisoning amount as the input variable is large, in comparison with a case where the value of the HC poisoning amount is small.

Figure 9:
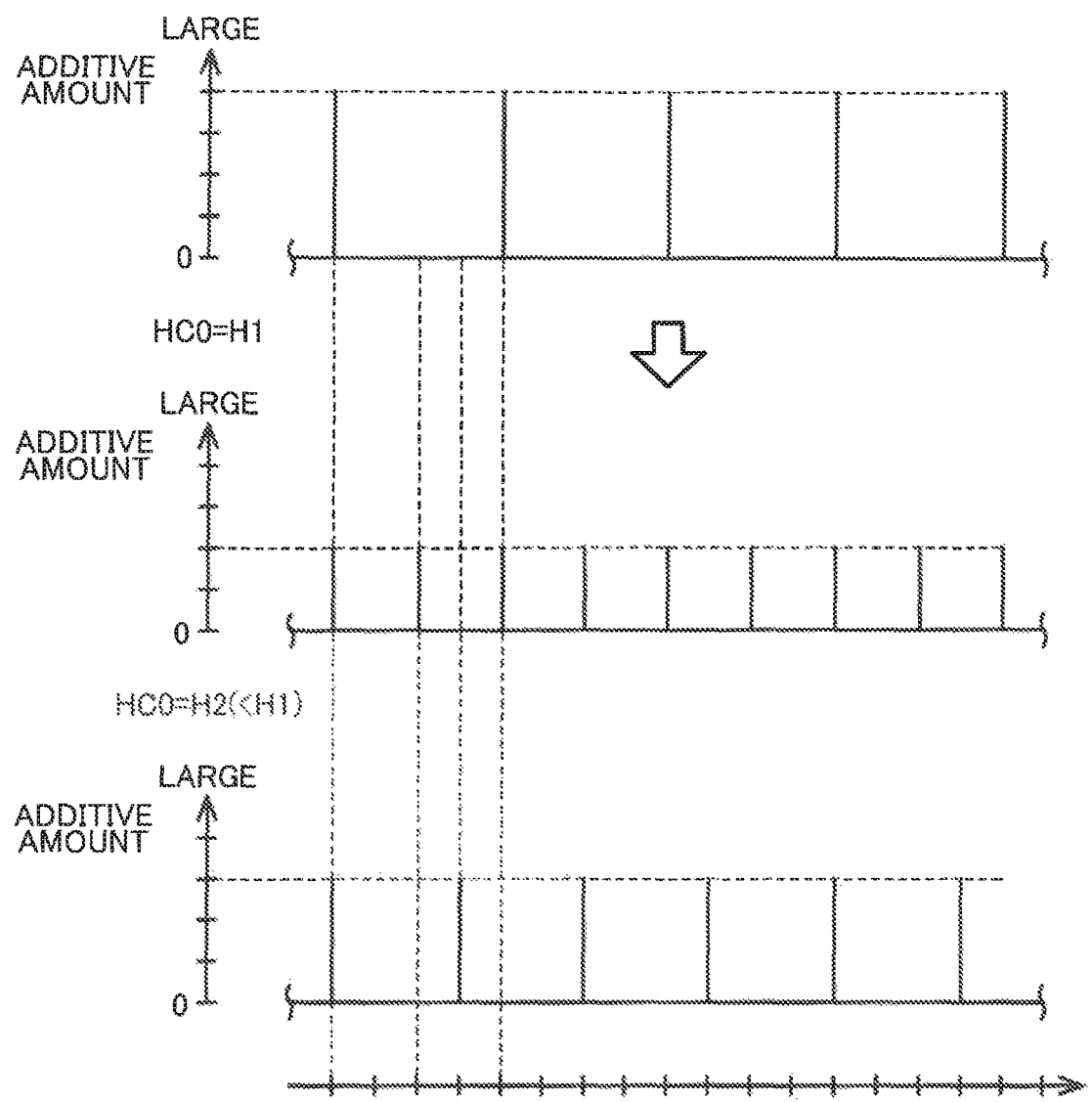
FIG. 9 is a time chart illustrating a HC poisoning recovery stand-by process according to a third embodiment.

FIG. 9 exemplifies the HC poisoning recovery stand-by process according to the present embodiment. Note that an upper diagram of FIG. 9 is the same as the upper diagram of FIG. 6, and an intermediate diagram of FIG. 9 illustrates an example in which the additive amount per once and the time interval for addition are set similarly to the lower diagram of FIG. 6, assuming a case where a HC poisoning amount HC0 at the start of the HC poisoning recovery stand-by process is an amount H1. Further, a lower diagram of FIG. 9 illustrates an example in which the additive amount per once and the time interval for addition are set to "¾" of values in the first purification process in the normal time, as an example in which the temperature Tscr is the same as the case illustrated in the intermediate diagram in FIG. 9 and the HC poisoning amount at the start of the HC poisoning recovery stand-by process is an amount H2, which is smaller than the amount H1. Respective diagrams of FIG. 9 illustrate a case where the process is performed at the same operating point. Even here, it is not intended to limit, by FIG. 9, magnifications of the additive amount per once and the time interval for addition of the HC poisoning recovery stand-by process with respect to the first purification process in the normal time. FIG. 9 schematically illustrates that the first purification process in the normal time and the HC poisoning recovery stand-by process have the same hydrocarbon consumption rate.

Fourth Embodiment

The following describes the fourth embodiment mainly about differences from the third embodiment with reference to the drawings.

In the present embodiment, at the time when an additive amount per once is reduced and a time interval for addition is shortened in a HC poisoning recovery stand-by process, its shortening amount is made larger than that in the third embodiment. This is a setting to further restrain a decrease in a purification rate due to the reduction of the additive amount per once. Here, the time interval, as well as the additive amount per once, is adjusted based on experimental results and the like in advance, so that the aforementioned four-dimensional map is formed in advance based on the adjusted value and stored in a memory 54. The adjusted value here is a value that can reduce the HC poisoning amount of the second catalyst 34 at the time when the rotation speed NE, the requested torque, the temperature Tscr, and the HC poisoning amount are given, and is also a value that increases the purification rate as high as possible.

Figure 10:
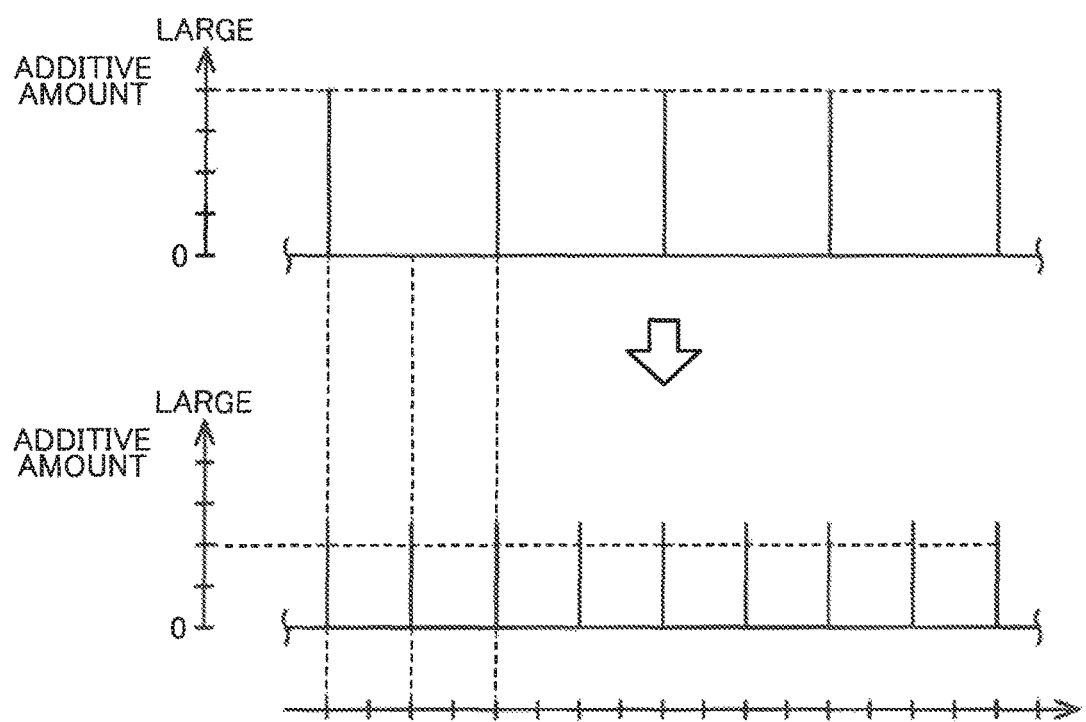
FIG. 10 is a time chart illustrating a HC poisoning recovery stand-by process according to a fourth embodiment.

FIG. 10 exemplifies the HC poisoning recovery stand-by process according to the present embodiment. An upper diagram of FIG. 10 is the same as the upper diagram of FIG. 6. Further, a lower diagram of FIG. 10 relates to the HC poisoning recovery stand-by process and illustrates an example in which the additive amount per once is set to "⅝" of a value of the first purification process in the normal time, and the time interval for addition is set to "½" of a value in the first purification process in the normal time. The upper diagram of FIG. 10 and the lower diagram of FIG. 10 illustrate a case where the process is performed at the same operating point. Even here, it is not intended to limit, by FIG. 10, magnifications of the additive amount per once and the time interval for addition of the HC poisoning recovery stand-by process with respect to the first purification process in the normal time. FIG. 10 schematically illustrates that a hydrocarbon consumption rate of the HC poisoning recovery stand-by process is larger than that of the first purification process in the normal time.

Note that, in a case where the operating point where the HC poisoning recovery stand-by process is performed deviates from an operating point determined by input variables of a two-dimensional map that determines the additive amount per once and the like of the first purification process in the normal time, the HC poisoning recovery stand-by process has the following characteristics. That is, even if the hydrocarbon consumption rate is decreased at the operating point where the HC poisoning recovery stand-by process is executed, the purification rate can be increased by increasing the additive amount per once.

Incidentally, in a case where the operating point where the HC poisoning recovery stand-by process is performed deviates from the operating point determined by the input variables of the two-dimensional map that determines the additive amount per once and the like of the first purification process in the normal time, the hydrocarbon consumption rate increases at the start of execution of the HC poisoning recovery stand-by process, in comparison with a hydrocarbon consumption rate just before the start of execution. The reason is as follows: while the operating point at the start of execution is similar to the operating point just before the start of execution, the operating points similar to each other as such have similar additive amounts per once and similar time intervals for addition on maximizing the NOx purification rate, so that their hydrocarbon consumption rates are also similar to each other.

<Correspondence> The correspondence between what is described in "SUMMARY" and what is described in the embodiments is as follows. The following shows the correspondence for each number of the solutions described in "SUMMARY." Note that, in the following description, the "CPU 52 configured to execute a predetermined process according to a program stored in the memory 54" is referred to as the "CPU 52 configured to execute a predetermined process" for the simple description.

1. The exhaust purification control device corresponds to the control device 50. Further, to "execute the HC poisoning recovery stand-by process prior to start of execution of the second purification process on the condition that the execution request of the second purification process is generated" corresponds to the CPU 52 making a positive determination in both step S10 and step S18 in FIG. 5 and executing the process of step S20.

2. In comparison with the first purification process in the normal time as illustrated in the upper diagram of FIG. 6, the CPU 52 executes a process of shortening the time interval for addition in the HC poisoning recovery stand-by process as illustrated in the lower drawing of FIG. 6. Further, in comparison with the first purification process in the normal time as illustrated in the upper diagram of FIG. 8, the CPU 52 executes a process of shortening the time interval for addition in the HC poisoning recovery stand-by process as illustrated in the intermediate diagram of FIG. 8 and the lower drawing of FIG. 8. Further, in comparison with the first purification process in the normal time as illustrated in the upper diagram of FIG. 9, the CPU 52 executes a process of shortening the time interval for addition in the HC poisoning recovery stand-by process as illustrated in the intermediate diagram of FIG. 9 and the lower drawing of FIG. 9. Further, in comparison with the first purification process in the normal time as illustrated in the upper diagram of FIG. 10, the CPU 52 executes a process of shortening the time interval for addition in the HC poisoning recovery stand-by process as illustrated in the lower drawing of FIG. 10.

3. In comparison with the first purification process in the normal time as illustrated in the upper diagram of FIG. 10, the CPU 52 executes a process of increasing the hydrocarbon consumption rate in the HC poisoning recovery stand-by process as illustrated in the lower drawing of FIG. 10.

4. In comparison with the case where the temperature Tscr is low as exemplified in the intermediate drawing of FIG. 8, in the case where the temperature Tscr is high as exemplified in the lower drawing of FIG. 8, the CPU 52 executes a process of decreasing the reduction amount of the additive amount per once.

5. In comparison with the case where the HC poisoning amount HC0 is small as exemplified in the lower drawing of FIG. 9, in the case where the HC poisoning amount HC0 is large as exemplified in the intermediate drawing of FIG. 9, the CPU 52 executes a process of increasing the reduction amount of the additive amount per once.

6. The second purification rate calculation portion corresponds to the CPU 52 that executes the process of step S14, and the prescribed value corresponds to the first purification rate R1. 7. The first purification rate calculation portion corresponds to the CPU 52 making a positive determination in step S18 and shifting to the process of step S22, and particularly, the first purification rate calculation portion corresponds to the CPU 52 that executes the process of step S16.

Other Embodiments

Note that at least one of the matters of the above embodiments may be changed as follows. "As for Switch Request to Second Purification Process" In the above embodiments, when the detection value of the NOx concentration in the exhaust gas in the downstream of the first catalyst 30, detected by the NOx concentration sensor 60, is the threshold or more, the switch request is generated. However, the present disclosure is not limited to this. For example, the switch request may be generated when the operating point determined by the rotation speed and the requested torque as a load falls within a predetermined region. Further, for example, an injection amount may be used as the load instead of the requested torque. Further, in a case of a vehicle having a strong correlation between a vehicle speed and an operating point determined by the rotation speed NE and the load, for example, like a vehicle that uses only an internal combustion engine as a motor that gives power to driving wheels, the switch request may be generated based on the vehicle speed instead of the rotation speed NE and the load.

"As for HC Poisoning Recovery Stand-by Process" The HC poisoning recovery stand-by process of variably setting the additive amount per once depending on the HC poisoning amount at the start of execution of the HC poisoning recovery stand-by process is not limited to a process in which the additive amount per once is set variably depending on the temperature Tscr of the second catalyst 34, but may be a process in which the additive amount per once is not variable depending on the temperature Tscr of the second catalyst 34.

Further, the additive amount per once may be set variably depending on a HC poisoning amount to be updated every time during the HC poisoning recovery stand-by process. That is, the additive amount per once may be increased as the HC poisoning amount decreases.

The HC poisoning recovery stand-by process in which the hydrocarbon consumption rate is set to be higher than the consumption rate in the first purification process in the normal time is not limited to a process in which the additive amount per once is variable depending on the HC poisoning amount and the temperature Tscr of the second catalyst 34. For example, the process may be such that the additive amount per once is variable based on only either one of the HC poisoning amount and the temperature Tscr of the second catalyst 34. Further, for example, the process may be a process in which the additive amount per once is not variable depending on either the HC poisoning amount or the temperature Tscr of the second catalyst 34.

The present disclosure is not limited to such a configuration in which the additive amount per once and the time interval for addition are set variably depending on the rotation speed NE and the requested torque as the load. For example, the injection amount of the fuel injection valve 16 may be used as the load instead of the requested torque. Further, for example, in a case where the rotation speed NE and the load have a strong correlation with the vehicle speed like a vehicle that uses only an internal combustion engine as a motor that gives power to driving wheels, the additive amount per once and the time interval for addition may be set variably depending on the vehicle speed, instead of the rotation speed NE and the load.

Further, for example, the additive amount per once and the time interval may be set variably based on the flow rate of the exhaust gas flowing into the first catalyst 30, the temperature of the exhaust gas, and the NOx amount in the exhaust gas, instead of the rotation speed NE and the load. Here, the flow rate of the exhaust gas may be calculated, for example, such that an air flow meter is provided in the intake passage 12 so as to calculate the flow rate based on an intake-air amount detected by the air flow meter and a fuel quantity injected from the fuel injection valve 16. Further, the amount of NOx in the exhaust gas may be calculated such that a NOx concentration sensor is provided in the upstream of the first catalyst 30, so as to calculate the amount of NOx from a detection value of the sensor and the flow rate of the exhaust gas. Further, the temperature of the exhaust gas may be a detection value of a temperature sensor provided on the upstream side relative to the first catalyst 30.

In each of the above embodiments, the values of the input variable of the two-dimensional map for the first purification process in the normal time and the values of the input variable of the two-dimensional map for the HC poisoning recovery stand-by process partially overlap with each other. However, each of the above embodiments does not particularly refer to what kind of operating points the overlapping operating points are. Here, in a case where the first catalyst 30 is normal, the overlapping operating points may include an operating point where the first purification process is surely executed. Hereby, even in a case where the purification ability of the first purification process decreases due to sulfur poisoning or thermal degradation of the first catalyst 30 and the switch request to the second purification process is generated at the time when the flow rate of NOx is lower than in a case where the purification ability does not decrease, it is possible to deal with this appropriately.

As described in the above paragraph about "As for Switch Request to Second Purification Process," in a case where the switch request is determined by the rotation speed NE and the load, a single map may be used as the map for the first purification process in the normal time and the map for the HC poisoning recovery stand-by process in the first embodiment. Even in this case, the additive amount at an operating point close to the operating point where the switch request is generated, among the additive amounts per once in the first purification process in the normal time, is larger than the additive amount at an operating point closer to the operating point where the switch request is generated, among the operating points where the HC poisoning recovery stand-by process is executed. When the first purification process in the normal time is switched to the HC poisoning recovery stand-by process, the additive amount per once is reduced.

Further, in the case where the switch request is determined by the rotation speed NE and the load, the values of the input variable of the map for the HC poisoning recovery stand-by process and the values of the input variable of the map for the first purification process in the normal time may not include a common value in the second to fourth embodiments. Even in this case, in the fourth embodiment, for example, the hydrocarbon consumption rate increases at the start of execution of the HC poisoning recovery stand-by process, in comparison with a hydrocarbon consumption rate just before the start of execution. In other words, the hydrocarbon consumption rate increases in comparison with the hydrocarbon consumption rate just before the execution request of the second purification process is generated. The reason is as follows: since the operating point at the start of execution of the HC poisoning recovery stand-by process is close to the operating point just before the start of execution, their additive amounts per once and their time intervals for addition to optimize their purification rates at those operating points in pair are similar to each other, so that their hydrocarbon consumption rates to optimize their purification rates at the operating points in pair are also similar to each other. In the HC poisoning recovery stand-by process, the additive amount per once is reduced with respect to the value to optimize the purification rate, and a decrease in the purification rate because of that is restrained by increasing the hydrocarbon consumption rate, so that the hydrocarbon consumption rate increases along with the switch to the HC poisoning recovery stand-by process.

The values of the input variable of the maps that determine the additive amount per once and the time interval for addition for the first purification process in the normal time are expanded throughout presumable operating points that the internal combustion engine 10 may take, so that the additive amount per one addition and the time interval for addition in the HC poisoning recovery stand-by process may be set by a correction process of values based on the maps for the first purification process in the normal time. That is, for example, the additive amount per once and the time interval for addition to be determined from the maps for the first purification process in the normal time may be multiplied by a correction coefficient, so as to calculate the additive amount per once and the time interval for addition in the HC poisoning recovery stand-by process. Here, the correction coefficient may be a fixed value, or may be set variably depending on the temperature Tscr or set variably depending on the temperature Tscr and the HC poisoning amount. Naturally, the present disclosure is not limited to this, and the correction coefficient may be set variably only depending on the rotation speed and the load, or parameters that variably set the correction coefficient may include the rotation speed and the load in addition to at least one of the temperature Tscr and the HC poisoning amount.

When the additive amount per once is reduced, it is not necessary to shorten the time interval for addition. "As for HC Poisoning Amount Calculation Portion" The slip amount ΔHC is calculated based on the rotation speed NE, the requested torque as a load, the additive amount, and the time interval for addition, but the present disclosure is not limited to this. For example, the fuel quantity injected from the fuel injection valve 16 may be used as the load instead of the requested torque. Further, for example, in a case where the rotation speed NE and the load have a strong correlation with the vehicle speed like a vehicle that uses only an internal combustion engine as a motor that gives power to driving wheels, the vehicle speed may be used instead of the rotation speed NE and the load. Further, instead of the rotation speed NE and the load, for example, a temperature of the exhaust gas flowing into the second catalyst 34, a flow rate of the exhaust gas, and a NOx amount in the exhaust gas may be used.

Further, for example, a hydrocarbon concentration sensor may be provided in the downstream of the first catalyst 30 but in the upstream of the second catalyst 34, so that the slip amount ΔHC may be calculated based on a detection value of the sensor and a flow rate of the exhaust gas.

The present disclosure is not limited to such a configuration that calculates the HC poisoning amount of the second catalyst 34 due to hydrocarbon slipping into the downstream of the first catalyst 30 during the first purification process, but the HC poisoning amount of the second catalyst 34 may be calculated further in consideration of hydrocarbon slipping into the downstream of the first catalyst 30 due to execution of the third purification process. This can be realized such that a hydrocarbon concentration sensor is provided in the upstream of the second catalyst 34, for example, so that the slip amount ΔHC is calculated based on a detection value of the sensor and the flow rate of the exhaust gas.

"As for First Purification Rate Calculation Portion" In the above embodiments, the first purification rate R1 is calculated based on the rotation speed NE, the requested torque as a load, the additive amount, and the time interval for addition, but the present disclosure is not limited to this. For example, the fuel quantity injected from the fuel injection valve 16 may be used as the load instead of the requested torque. Further, for example, in a case where the rotation speed NE and the load have a strong correlation with the vehicle speed like a vehicle that uses only an internal combustion engine as a motor that gives power to driving wheels, the vehicle speed may be used instead of the rotation speed NE and the load. Further, instead of the rotation speed NE and the load, for example, a temperature of the exhaust gas flowing into the first catalyst 30, a flow rate of the exhaust gas, and a NOx amount in the exhaust gas may be used.

"As for Second Purification Process" The present disclosure is not limited to such a configuration in which the second purification process is executed while the first purification process is stopped. For example, when the vehicle enters an operating range in which NOx cannot be sufficiently purified only by the first purification process sufficiently during execution of the first purification process, the second purification process may be executed as well. Even in this case, when the second purification rate R2 is low due to HC poisoning, the HC poisoning recovery stand-by process is executed without executing the second purification process, thereby making it possible to increase the purification ability of the second purification process at the start of the second purification process. Note that, in this case, even after the start of the second purification process, when the slip amount of hydrocarbon from the first catalyst 30 is large due to the first purification process in the normal time, a process similar to the HC poisoning recovery stand-by process is executed as the first purification process, so as to reduce the slip amount ΔHC.

"As for Condition in which Second Purification Process is not executed" In the above embodiments, when the second purification rate R2 is lower than the first purification rate R1, the second purification process is not executed, but the present disclosure is not limited to this. For example, in a case where a logical sum of a proposition that the second purification rate R2 is lower than the first purification rate R1 and a proposition that the second purification rate R2 is lower than a prescribed value is true, the second purification process may not be executed. Here, the prescribed value should be a predetermined percentage (e.g., 90% or more) of the second purification rate R2 at the time when the HC poisoning amount is zero. Note that, when the first purification rate R1 at the time when the switch request is generated is surely lower than the prescribed value, a process of directly comparing the magnitude of the first purification rate R1 with the magnitude of the second purification rate R2 may not be executed, and when the second purification rate R2 is lower than the prescribed value, the second purification process may not be executed. Even in this case, if the first purification rate R1 is higher than the second purification rate R2, the second purification process is not executed, so the second purification process is not executed on the condition that the first purification rate R1 is higher than the second purification rate R2.

Further, as described in "As for Second Purification Process," when the switch request from the execution of only the first purification processes to the execution of both of the first purification process and the second purification process is generated, it is desirable that a target for comparison with the second purification rate R2 be a prescribed value independent from the first purification rate R1.

Further, when the execution request of the second purification process is generated during execution of the first purification process, the second purification process may be executed after the HC poisoning recovery stand-by process is executed for a predetermined time, regardless of the HC poisoning amount of the second catalyst 34. That is, when the CPU 52 makes a positive determination in step S10 of FIG. 5, the CPU 52 may shift to the process of step S20 to execute the process of step S20 over a predetermined time.

"As for Second Purification Rate Calculation Portion" The above embodiments assume that the temperature of the second catalyst 34 at the time when the switch request to the second purification process is generated is the temperature that can keep a high purification rate. However, in a case where this assumption is not established, the temperature Tscr of the second catalyst 34 may be taken into consideration for the calculation of the second purification rate R2. This can be realized, for example, such that a basic purification ratio is calculated based on a one-dimensional map that determines a relationship between the temperature Tscr of the second catalyst 34 and the basic purification rate, and the basic purification ratio thus calculated is corrected by the HC poisoning amount so as to be taken as the second purification rate R2.

In the above embodiments, the purification ability of the second catalyst 34 is sufficient enough even when the NOx amount in the exhaust gas is maximum among NOx amounts in the exhaust gas to be exhausted in every operating state of the internal combustion engine 10. However, it may be assumed that, in a case where the NOx amount in the exhaust gas is not less than a prescribed amount that is smaller than the maximum, the purification rate decreases as the NOx amount is larger. In this case, the second purification rate R2 may be calculated based on a presumable NOx flow rate to flow into the second catalyst 34 when it is assumed that the second purification process is executed. Here, the presumable NOx flow rate to flow into the second catalyst 34 is estimated by a process similar to the estimation of the NOx amount in the exhaust gas flowing into the first catalyst 30. Note that, as described in "As for Second Purification Process," in a case where the first purification process is constituted even at the time of executing the second purification process, the NOx flow rate to flow into the second catalyst 34 is set to an amount that is not purified by the first catalyst 30 in a NOx flow rate to flow into the first catalyst 30. This can be calculated based on the purification rate of the first purification process at the time of executing both of the first purification process and the second purification process, and a NOx flow rate currently flowing into the first catalyst 30.

"As for Temperature of Second Catalyst 34" In the above embodiments, the temperature Tscr of the second catalyst 34 is estimated based on the upstream temperature Tsu and the downstream temperature Tsd of the second catalyst 34, but the present disclosure is not limited to this. The upstream temperature Tsu of the second catalyst 34 may be regarded as the temperature of the second catalyst 34, for example, and the downstream temperature Tsd of the second catalyst 34 may be regarded as the temperature of the second catalyst 34, for example. Further, a temperature sensor that detects the temperature of the second catalyst 34 may be provided so that a detection value thereof is used.

"As for Second Catalyst" In the above embodiments, the first catalyst 30 is placed on the floor and the second catalyst 34 is placed under the floor, but the present disclosure is not limited to this. For example, both the first catalyst 30 and the second catalyst 34 may be placed on the floor. Further, for example, a single purification device in which a function of the second catalyst 34 and a function of the DPF 32 are integrated may be formed.

"As for Exhaust Purification Control Device" The present disclosure is not limited to such a configuration that the control device 50 includes the CPU 52 and the memory 54 so as to perform software processing on all various processes described above. For example, the control device 50 may include an ASIC that executes at least a part of the processes such that the process of the poisoning amount calculation portion M14 is processed by exclusive hardware (an application specific integrated circuit: ASIC).

"Others" In a case of an exhaust purification control device for an internal combustion engine provided in a series hybrid electric vehicle, for example, the exhaust purification control device may be a control device that is set so as not to perform an engine operation in an operating range suitable for the third purification process to be executed, so that the control device does not execute the third purification process.

It is not necessary to provide the hydrocarbon addition valve 40 in the downstream of the supercharger 22 in the exhaust passage 20, and the hydrocarbon addition valve 40 may be provided in the upstream of the supercharger 22 in the exhaust passage 20.

What is claimed is:

1. A control device for an exhaust gas control apparatus provided to an internal combustion engine, the exhaust gas control apparatus including
a first NOx catalyst provided in an exhaust passage of the internal combustion engine,
a hydrocarbon addition valve configured to add hydrocarbon to exhaust gas flowing into the first NOx catalyst,
a second NOx catalyst provided in a downstream of the first NOx catalyst, and
a urea addition valve provided between the first NOx catalyst and the second NOx catalyst in the exhaust passage,
the first NOx catalyst having characteristics in which NOx in the exhaust gas is reduced when a hydrocarbon concentration in the exhaust gas flowing into the first NOx catalyst changes to fluctuate with an amplitude within a prescribed range at a time interval within a prescribed range and a storage amount of NOx increases when the time interval becomes longer than a value within the prescribed range,
the control device comprising
an electronic control unit configured to
  i) execute a first purification process, the first purification process being a process of purifying NOx by intermittently adding the hydrocarbon into the exhaust gas from the hydrocarbon addition valve and changing the hydrocarbon concentration in the exhaust gas flowing into the first NOx catalyst to fluctuate with the amplitude within the prescribed range at the time interval within the prescribed range,
  ii) execute a second purification process, the second purification process being a process of purifying NOx by use of the second NOx catalyst by adding urea water into the exhaust gas from the urea addition valve, and
  iii) execute a hydrocarbon poisoning recovery stand-by process, the hydrocarbon poisoning recovery stand-by process being a process of, at a time when an execution request of the second purification process is generated during execution of the first purification process, reducing an additive amount per once from the hydrocarbon addition valve as compared with an additive amount per once before the execution request is generated, prior to start of execution of the second purification process.

2. The control device according to claim 1, wherein the electronic control unit is configured to, as the hydrocarbon poisoning recovery stand-by process, reduce the additive amount per once as compared with the additive amount per once before the execution request is generated, and shorten the time interval for the intermittent addition of the hydrocarbon as compared with a time interval before the execution request is generated.

3. The control device according to claim 2, wherein:
the electronic control unit is configured to reduce the time interval as the hydrocarbon poisoning recovery stand-by process, such that a consumption rate of the hydrocarbon increases as compared with a consumption rate before the execution request is generated; and
the consumption rate is an additive amount of the hydrocarbon per unit time.

4. The control device according to claim 1, wherein the electronic control unit is configured to execute the hydrocarbon poisoning recovery stand-by process, such that a reduction amount of the additive amount per once at a time when a temperature of the second NOx catalyst is high is smaller than a reduction amount of the additive amount per once at a time when the temperature of the second NOx catalyst is low.

5. The control device according to claim 1, wherein the electronic control unit is configured to
calculate a hydrocarbon poisoning amount of the second NOx catalyst, and
execute the hydrocarbon poisoning recovery stand-by process such that a reduction amount of the additive amount per once at a time when the hydrocarbon poisoning amount is large is larger than a reduction amount of the additive amount per once at a time when the hydrocarbon poisoning amount is small.

6. The control device according to claim 1, wherein the electronic control unit is configured
  i) to calculate the hydrocarbon poisoning amount of the second NOx catalyst,
  ii) to calculate a second purification rate based on the hydrocarbon poisoning amount during the execution of the first purification process, the second purification rate being an estimate of a NOx purification rate of the second purification process,
  iii) when the first purification process is executed and the execution request of the second purification process is generated, not to execute the second purification process on a condition that the second purification rate is less than a prescribed value, and
  iv) when the second purification process is not executed on the condition that the second purification rate is less than the prescribed value, to execute the hydrocarbon poisoning recovery stand-by process.

7. The control device according to claim 6, wherein the electronic control unit is configured to calculate a first purification rate, which is a NOx purification rate of the first purification process,
the prescribed value is the first purification rate, and
the electronic control unit is configured to, when the second purification rate is equal to or larger than the first purification rate due to execution of the hydrocarbon poisoning recovery stand-by process, execute the second purification process and stop the execution of the first purification process.

* * * * *